United States Patent
Meyerzon et al.

(10) Patent No.: US 10,860,956 B2
(45) Date of Patent: Dec. 8, 2020

(54) EXTRACTING AND SURFACING USER WORK ATTRIBUTES FROM DATA SOURCES

(71) Applicant: Microsoft Technology Licensing, LLC, Redmond, WA (US)

(72) Inventors: Dmitriy Meyerzon, Bellevue, WA (US); Zheng Chen, Beijing (CN); Welly Sugiarto Lee, Redmond, WA (US); Lei Ji, Beijing (CN); Jun Yan, Beijing (CN); Zhongyuan Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 15/564,158

(22) PCT Filed: Apr. 28, 2016

(86) PCT No.: PCT/US2016/029644
§ 371 (c)(1),
(2) Date: Oct. 3, 2017

(87) PCT Pub. No.: WO2016/176379
PCT Pub. Date: Nov. 3, 2016

(65) Prior Publication Data
US 2018/0082240 A1  Mar. 22, 2018

(30) Foreign Application Priority Data

Apr. 30, 2015 (WO) ................ PCT/CN2015/077952
May 15, 2015 (CN) .......................... 2015 1 0250218

(51) Int. Cl.
*G06F 17/00* (2019.01)
*G06Q 10/06* (2012.01)
(Continued)

(52) U.S. Cl.
CPC ..... *G06Q 10/063112* (2013.01); *G06F 16/23* (2019.01); *G06F 16/24575* (2019.01);
(Continued)

(58) Field of Classification Search
CPC ............ G06Q 10/063112; G06Q 30/00; G06F 16/23; G06F 16/24575; G06F 16/9535;
(Continued)

(56) References Cited

U.S. PATENT DOCUMENTS 6,026,410 A  2/2000  Allen et al.
6,098,047 A  8/2000  Oku et al.
(Continued)

FOREIGN PATENT DOCUMENTS

CN   101094525 B   6/2010
CN   102054021 A   5/2011
(Continued)

OTHER PUBLICATIONS

"First Office Action and Search Report Issued in Chinese Patent Application No. 201510250218.7", dated Jul. 2, 2020, 11 Pages.
(Continued)

*Primary Examiner* — Greta L Robinson
(74) *Attorney, Agent, or Firm* — Christopher J. Volkmann; Kelly, Holt & Christenson, PLLC

(57) ABSTRACT

A computing system comprises, in one example, a display system, a user profile update system configured to update a user profile for a given user, a data extraction system configured to analyze a data source and to extract, from the data source, at least one work attribute associated with the given user, and a surfacing system. The surfacing system comprises a suggestion generator component configured to generate a user profile suggestion based on the at least one work attribute, and a display system controller configured to control the display system to generate a user interface
(Continued)

display, with user input mechanisms, that displays the user profile suggestion and to detect a user interaction with the user input mechanisms. The user profile update system updates the user profile based on the detected user interaction.

20 Claims, 25 Drawing Sheets

(51) Int. Cl.
    *G06F 16/23* (2019.01)
    *G06F 16/2457* (2019.01)
    *H04L 29/08* (2006.01)
    *G06F 16/9535* (2019.01)

(52) U.S. Cl.
    CPC ........ *H04L 67/306* (2013.01); *G06F 16/9535* (2019.01); *H04L 67/22* (2013.01)

(58) Field of Classification Search
    CPC .... G06F 9/44505; G06F 11/34; H04L 67/306; H04L 67/22; H04L 43/00
    See application file for complete search history.

(56) References Cited

U.S. PATENT DOCUMENTS

| | | | |
|---|---|---|---|
| 6,263,335 | B1 | 7/2001 | Paik et al. |
| 7,401,025 | B1* | 7/2008 | Lokitz ................ G06Q 30/0281 |
| | | | 705/346 |
| 7,899,666 | B2 | 3/2011 | Varone |
| 8,170,971 | B1 | 5/2012 | Wilson et al. |
| 8,600,926 | B2 | 12/2013 | Flinn et al. |
| 8,650,194 | B2 | 2/2014 | Hu |
| 8,818,931 | B2 | 8/2014 | Flinn et al. |
| 9,754,233 | B1* | 9/2017 | Hamouda ........ G06Q 10/06398 |
| 2008/0134043 | A1* | 6/2008 | Georgis ................ H04N 7/10 |
| | | | 715/733 |
| 2008/0294655 | A1* | 11/2008 | Picault ................ G06Q 10/10 |
| 2009/0164926 | A1 | 6/2009 | Boyle et al. |
| 2010/0076968 | A1* | 3/2010 | Boyns .................... H04L 67/22 |
| | | | 707/732 |
| 2011/0179060 | A1 | 7/2011 | Chilakamarri et al. |
| 2012/0030264 | A1 | 2/2012 | Horn |
| 2012/0078906 | A1 | 3/2012 | Anand et al. |
| 2012/0109980 | A1* | 5/2012 | Strauss .................. G06Q 30/02 |
| | | | 707/751 |
| 2012/0151377 | A1 | 6/2012 | Schultz et al. |
| 2012/0233151 | A1 | 9/2012 | Vanderwende et al. |
| 2012/0323928 | A1 | 12/2012 | Bhatia et al. |
| 2014/0114841 | A1 | 4/2014 | Kenkre et al. |
| 2014/0279890 | A1 | 9/2014 | Srinivasan et al. |
| 2015/0032821 | A1 | 1/2015 | Chen et al. |
| 2015/0046442 | A1* | 2/2015 | Bannur ............... G06F 16/9535 |
| | | | 707/731 |
| 2015/0127729 | A1* | 5/2015 | Madhavan ......... G06F 16/9535 |
| | | | 709/204 |
| 2015/0134745 | A1* | 5/2015 | Posse ................... G06F 16/248 |
| | | | 709/204 |

FOREIGN PATENT DOCUMENTS

| | | |
|---|---|---|
| CN | 102640143 A | 8/2012 |
| CN | 102696245 A | 9/2012 |
| CN | 103988203 A | 8/2014 |
| FR | 2973133 A1 | 9/2012 |
| WO | WO 2004/066163 A1 | 8/2004 |

OTHER PUBLICATIONS

McCallum, Andrew, "Information Extraction: Distilling Structured Data from Unstructured Text", In Journal of Queue—Social Computing, vol. 3 Issue 9, Nov. 2005, 10 Pages.

Serdyukov, et al., "The Right Expert at the Right Time and Place", In Proceedings of 7th International Conference of Practical Aspects of Knowledge Management, Nov. 22, 2008, 12 Pages.

International Search Report and Written Opinion for International Patent Application No. PCT/US2016/029644, dated Jul. 12, 2016, date of filing: Apr. 28, 2016, 11 pages.

\* cited by examiner

| PROJECT 214 | TAGLINE 216 | LOCATION 218 | CONTACT 220 |
|---|---|---|---|
| Smart Window for IDE (202) | Improve the IDE Experience | USA - Seattle | John Doe |
| Cloud Storage Project Alpha (204) | Cloud Storage When You Need It | USA – Cambridge | Jane Roe |
| Interview Assist (206) | Learn More & Reach New Heights | Unspecified | Robert K. |
| Security Analytics (208) | | USA – Silicon Valley | Kyle K. |
| A.C.M.E. (210) | Refine Your Business Solutions | Unspecified | Michael F. |
| Productivity Software Project Beta (212) | Get The Files You Need When You Need Them | China – Shanghai | Rachel J. |

FIG. 2-1

EXTRACTING AND SURFACING USER WORK ATTRIBUTES FROM DATA SOURCES

CROSS-REFERENCE TO RELATED APPLICATIONS

This Application is a Section 371 National Stage Application of International Application No. PCT/US2016/029644, filed Apr. 28, 2016 and published as WO 2016/176379 on Nov. 3, 2016, which claims priority to International Application No. PCT/CN2015/077952, filed Apr. 30, 2015 and to Chinese National Application CN 201510250218.7, filed May 15, 2015. The contents of these applications are hereby incorporated by reference in their entirety.

BACKGROUND

Organizations typically include users that perform various tasks and activities in fulfillment of organizational operations. For example, a service industry or project-based organization has projects that are broken down into activities. Each activity needs to be performed in order to complete the project.

Often, users within the organization desire to find work attributes or other work-related information for people within the organization. For example, a user may be looking for someone in the organization that has a particular work experience (e.g., current and/or past projects or other work). For instance, the user may desire to find an expert within a particular area.

The discussion above is merely provided for general background information and is not intended to be used as an aid in determining the scope of the claimed subject matter.

SUMMARY

A computing system comprises, in one example, a display system, a user profile update system updating a user profile for a given user, a data extraction system analyzing a data source and extracting, from the data source, at least one work attribute associated with the given user, and a surfacing system. The surfacing system comprises a suggestion generator component generating a user profile suggestion based on the at least one work attribute, and a display system controller controlling the display system to generate a user interface display, with user input mechanisms, that displays the user profile suggestion and detecting a user interaction with the user input mechanisms. The user profile update system updates the user profile based on the detected user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2-1 and 2-2 illustrate examples of structured data.

FIG. 2-3 illustrates an example of unstructured data.

FIGS. 2-4 and 2-5 illustrate examples of semi-structured data.

FIG. 3 is a flow diagram of one example of a method for crawling, parsing, and classifying content from one or more data sources.

FIGS. 4-1 and 4-2 are diagrammatic views of a node-edge graph, in one example.

FIG. 5 is a block diagram of one example of a knowledge extraction system.

DETAILED DESCRIPTION

Figure 1:
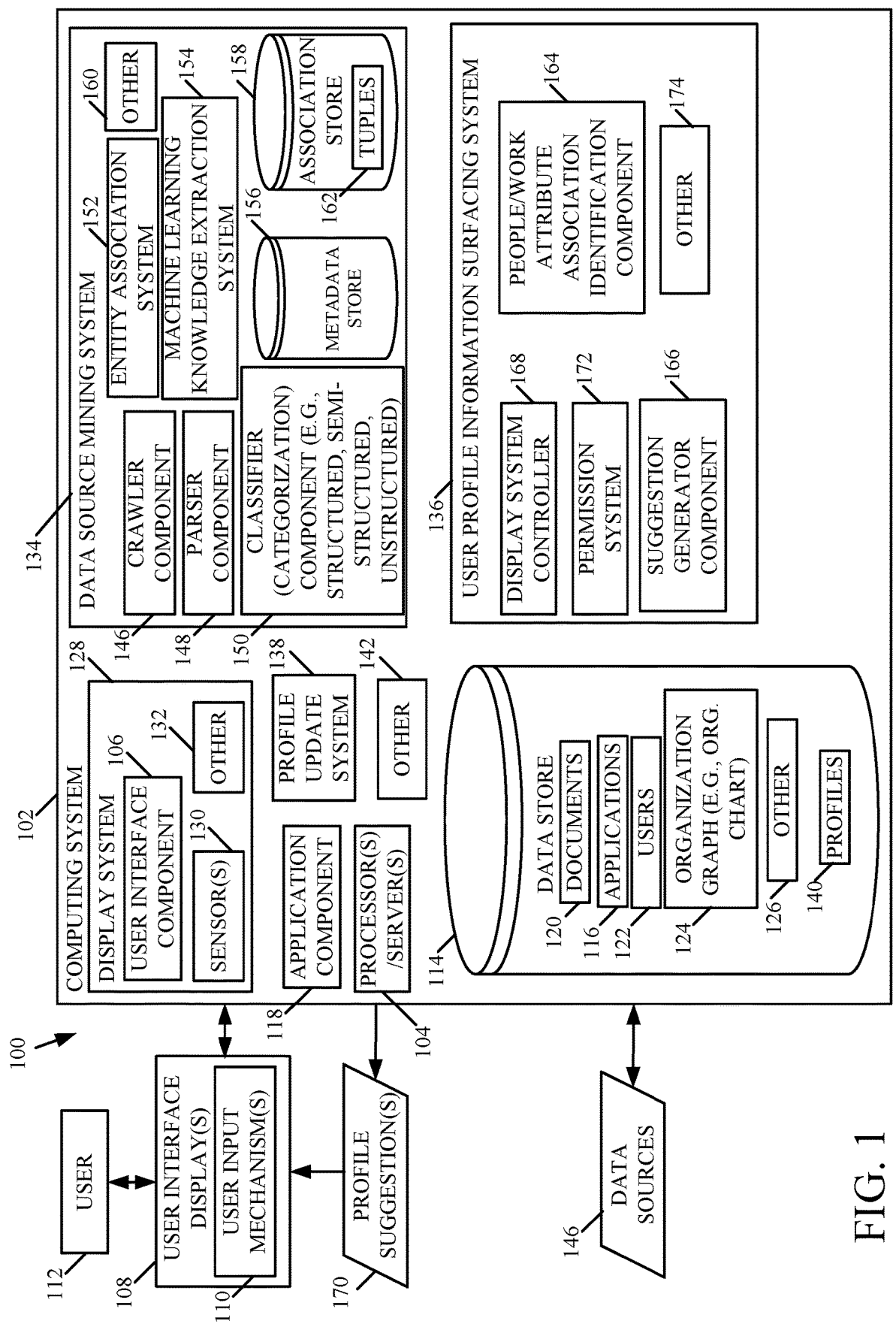
FIG. 1 is a block diagram of one example of a user work attribute extraction and surfacing architecture.

FIG. 1 is a block diagram of one example of a user work attribute extraction and surfacing architecture 100. Architecture 100 includes a computing system 102 that is accessible by one or more users through one or more user interface displays. A user interface component 106 generates user interface display(s) 108 with user input mechanisms 110, for interaction by a user 112. In FIG. 1, a single user 112 is illustrated interacting with computing system 102, for sake of illustration. However, in other examples, any number of users may interact with computing system 102.

User 112 can access computing system 102 locally or remotely. In one example, user 112 uses a client device that communicates with computing system 102 over a wide area network, such as the Internet. User 112 interacts with user input mechanisms 110 in order to control and manipulate computing system 102. For example, using user input mechanisms 110, user 112 can access data in a data store 114.

User input mechanisms 110 sense physical activities, for example by generating user interface display(s) 108 that are used to sense user interaction with computing system 102. The user interface display(s) 108 can include user input mechanism(s) 110 that sense user input in a wide variety of different ways, such as point and click devices (e.g., a computer mouse or track ball), a keyboard (either virtual or hardware), and/or a keypad. Where the display device used to display the user interface display(s) 108 is a touch sensitive display, the inputs can be provided as touch gestures. Similarly, the user inputs can illustratively be provided by voice inputs or other natural user interface input mechanisms as well.

Computing system 102 can be any type of system accessed by user 112. In one example, but not by limitation, computing system 102 comprises an electronic mail (email)

system, a collaboration system, a document sharing system, a scheduling system, and/or an enterprise system. In one example, computing system 102 comprises a business system, such as an enterprise resource planning (ERP) system, a customer resource management (CRM) system, a line-of-business system, or another business system.

As such, computing system 102 includes applications 116 that can be any of a variety of different application types. Applications 116 are executed using an application component 118 that facilitates functionality within computing system 102. By way of example, application component 118 can access information in data store 114. For example, data store 114 can store data and metadata. The data and metadata can define workflows, processes, entities, and a wide variety of other information 126. Application component 118 accesses the information in data store 114 in implementing programs, workflows, or other operations performed by application component 118.

By way of example, the entities stored in data store 114 can comprise or represent documents 120 and users 122 (e.g., user 112) within an enterprise, or other organization, in which computing system 102 is deployed. As used herein, a "document" refers to a collection of information, including but not limited to text, in any of a variety of different formats. Examples of documents include, but are not limited to, word processing documents, spreadsheet documents, slideshow or multimedia presentation documents, html documents, forms, notebooks, emails, meeting documents, and scheduling application documents, to name a few.

Data store 114 also stores an organization graph 124, such as an organization chart (or "org chart") or other type of data structure that relates users within an organization. As used herein, a "user" can be a member or person who interacts with architecture 100 (e.g., user 112) as well as a person who does not interact with architecture 100. For example, users can include any people within or associated with an organization for which work attributes or other information are stored, such as in profiles 122, for surfacing by architecture 100. A profile comprises, in one example, data and/or metadata which defines user attributes, such as, but not limited to, work attributes of a given user. In one example, the profile stores keywords or other information which define the user's expertise, skills, experience, behavior, personal preferences and characteristics, etc.

Organizational graph 124 comprises multiple nodes associated with people of an organization, and connections between the nodes representing relationships between the nodes. Organizational graph 124 can thus represent people and their roles within an organization, as well as connections or relationships between those people. The relationships can be any of a variety of different types. For example, organization chart 128 can define a flat (or horizontal) organization structure, a matrix organization structure, and/or a hierarchical organization structure.

For the sake of the present discussion, but not by limitation, embodiments will be described in the context of a hierarchical organization graph in which nodes are arranged in hierarchical parent/child relationships (e.g., a tree structure), where a parent node has one or more child nodes that depend therefrom, and each child node depends from at least one parent node.

In one example, a node in organization graph 124 can represent a particular user (e.g., user 112) within the organization, such as a member or employee. In this manner, organization graph 124 indicates relationships between individual people. Alternatively, or in addition, a node in organization graph 124 can represent a position in the organization (e.g., a particular director position, sales person, engineer, etc.) or a user group (e.g., a sales team, etc.).

Further, the organization graph 124 can be defined along any of a variety of organizational criteria. For example, organization graph 124 can represent the hierarchy of an organization's users in terms of rank (e.g., relationships of managers and sub-workers who make up an organization). Alternatively, or in addition, organization graph 124 can represent the hierarchy of an organization's members in terms of reporting relationships between people (e.g., a member's direct reports are child nodes). Also, organization graph 124 can show employee details, chains of command, departmental responsibility, and/or employee group alignment, for example.

In the example shown in FIG. 1, computing system 102 illustratively includes processor(s) and/or server(s) 104, a display system 128 (which, itself, includes user interface component 106 and one or more sensors 130, and it can include other items 132 as well), a data source mining system 134, a user profile information surfacing system 136, and a profile update system 138. Sensor(s) 130 are configured to detect inputs to display system 128. In one example, system 134, 136, and/or 138 also include sensors configured to detect inputs to those systems. Computing system 102 can include other items 142 as well.

In one example, processor(s)/server(s) 104 comprises at least one computer processor with associated memory and timing circuitry (not shown). The computer processor is illustratively a functional part of system 102 and is activated by, and facilitates the functionality of, other systems, components and items in computing system 102.

FIG. 1 shows a variety of different functional blocks. It will be noted that the blocks can be consolidated so that more functionality is performed by each block, or they can be divided so that they functionality is further distributed. It should also be noted that data store 114 can be any of a wide variety of different types of data stores. Further, data store 114 can be stored in multiple data stores. Also, the data store(s) can be local to the environments, agents, modules, and/or components that access them, or they can be remote therefrom and accessible by those environments, agents, modules, and/or components. Similarly, some can be local while others are remote.

By way of example, computing system 102 may be utilized by an organization that performs various work in fulfillment of organizational operations. For instance, a user within a service industry or project-based organization may perform work either individually, or as part of a team or collection of workers. Work includes, but is not limited to, an activity, a job, a task, a set of tasks, a topic area, a project, or any other opportunity for a user.

Further, by way of example, a user (e.g., user 112) within the organization may desire to find work attributes or other work-related information for other users. Work attributes can pertain to current or past work being performed by a user and include, but are not limited to, user skills, experience, certifications, education, project(s) that the user has or is working on, and/or topic or subject matter areas in which the user is working or has worked. For instance, user 112 may be looking for someone in the organization that has a particular work experience (e.g., current and/or past projects or other work) and/or may be considered an expert within a particular area.

One source of work attributes or other work-related information is user profile information stored in user profiles 140. However, in many scenarios, workers within an organization do not keep their profile up to date and many never add any information to their user profile. In this scenario, identifying other users based on work attributes, such as through an expertise location system, is very difficult and, even if results are returned, the results are likely to be irrelevant as the underlying data is stale and no longer relevant.

Embodiments described herein provide a number of features and advantages. By way of illustration, example user work attribute extraction and surfacing architecture 100 mines and extracts user work attributes from various data sources. The extracted user work attributes can then be used to create and/or update user profiles 140. As discussed in further detail below, data source mining system 134 is configured to access and mine data, from data sources, in the form of text, images, video, and/or any other type of information. The data sources can be external to computing system 102 (e.g., data sources 146) and/or internal to computing system 102 (e.g., documents 120). In mining data sources, system 134 identifies associations between the users and work attributes of those users. This information can then be surfaced by system 136 for inclusion in user profiles 140.

As discussed in further detail below, the work attributes can be surfaced as suggestions to a user for inclusion in the user's profile and/or used to automatically update a user's profile. The information surfaced by system 136 can include, but is not limited to, work attributes pertaining to current or past work (e.g., an activity, job, task, set of tasks, topic, and/or project) performed by a user either individually, or as part of a team or collection of workers. For sake of illustration, but not by limitation, some embodiments will be described herein in the context of identifying and extracting projects associated with the users. However, other types of user work attributes (or other profile information) can be obtained in addition to, or instead of, project information.

Architecture 100 thus facilitates the creation and maintenance of user profiles by automatically suggesting and/or adding work attributes, or other information, to the user profiles. This may further entice a user to provide additional user profile information. Rich user profile information facilitates more relevant results from an expertise recommendation or surfacing system (or other system), which improves the user experience as well as reduces computing time and overhead. By way of example, architecture 100 can reduce the number of searches a user must perform (and thus the round trips to the underlying data store(s)) required to surface relevant information to the user.

Data source mining system 134 is configured to mine data sources for user work attributes that are associated with users of computing system 102 (or other users). For example, system 134 can mine documents (e.g., documents 120 and/or documents from data sources 146) to identify textual references (or other references) to a given user along with an association to a particular work attribute. For instance, while a user may not write or author a document, the user's name may be mentioned within the document along with a description of what the user is doing or has done. In one particular example, as part of a monthly status update, a manager may prepare a document, such as a report, of all the projects that her team is working on, who is working on them, and a status of each project. Mining system 134 can mine this report to associate those users mentioned within the report with the corresponding projects. For sake of illustration, but not by limitation, some embodiments herein will be described in the context of data sources comprising documents. However, it is understood that other types of data sources can also be mined for work attributes.

As shown in FIG. 1, system 134 includes a crawler component 146, a parser component 148, a classifier (categorization) component 150, an entity association system 152, and a knowledge extraction system 154. Knowledge extraction system 154, in the present example, uses a machine learning framework to extract knowledge from the data sources (e.g., documents) being mined. System 134 also includes a metadata store 156, an association store 158, and can include other items 160, as well.

Crawler component 146 crawls documents (or other information from a data source) as the document becomes available or is updated. Parser component 148 is configured to parse the content obtained by crawler component 146, such as to index keywords from the data.

Then, classifier component 150 classifies or categorizes the document content based on a structure of the content. In the illustrated example, component 150 is configured to classify a given portion of content as either structured data, semi-structured data, or unstructured data. Different portions of a same document can be classified into different categories. For example, a given document can have portion(s) of structured data, portion(s) of semi-structured data, and/or portion(s) of unstructured data.

Structured data comprises an order arrangement or relationship of data, in some structured format. For instance, structured data can be arranged in rows and columns, such as in a table. In another example, structured data comprises an ordered list. The structured data thus resides in a fixed field within a record or file.

Figure 2:
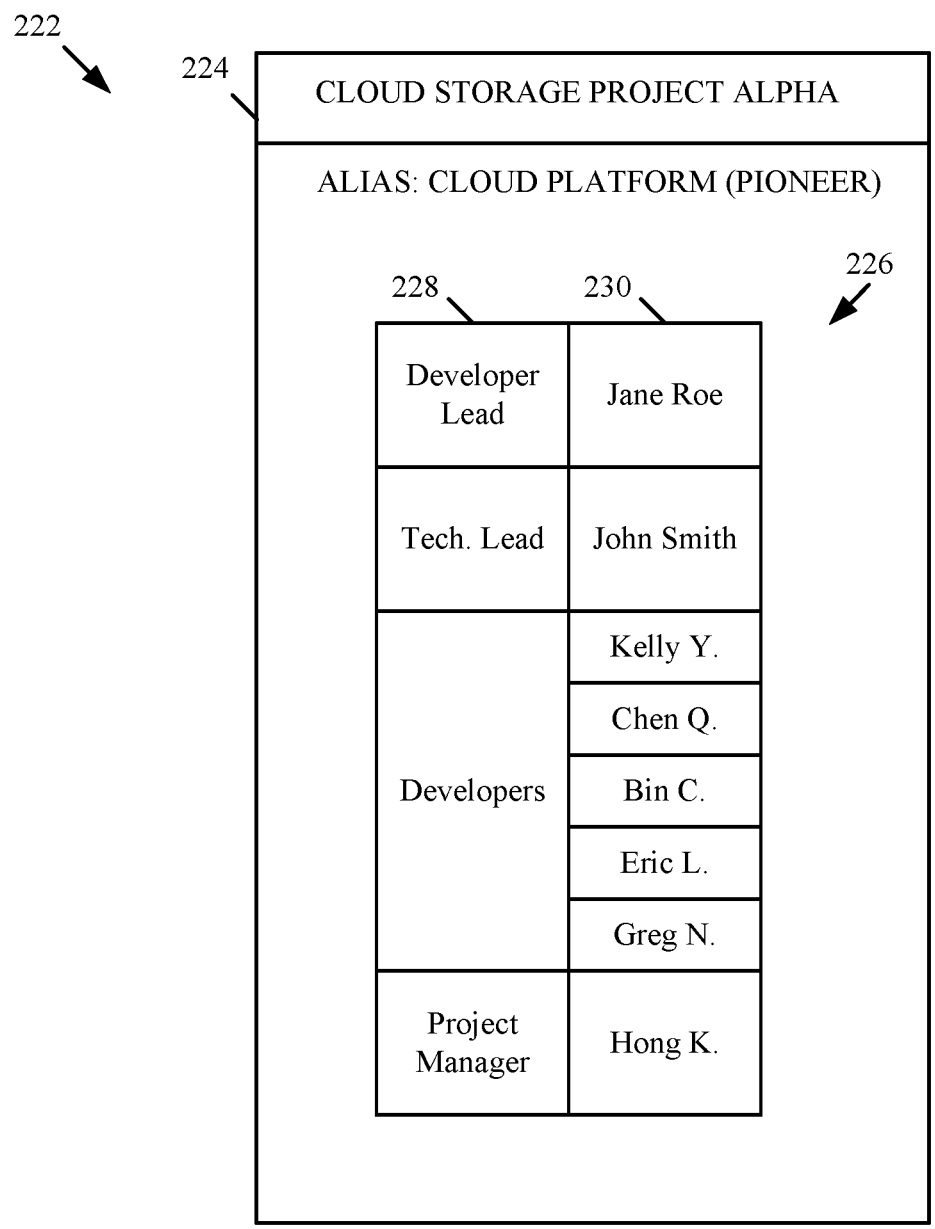

One example of structured data is illustrated in FIG. 2-1. FIG. 2-1 shows a table 200 having a plurality of rows 202-212 and a plurality of columns 214-220. Column 214 comprises a project field and column 220 comprises a contact or people field. As such, each row 202-212 associates one or more people with a particular project.

FIG. 2-2 illustrates another example of structured data. Document 222 has a project field 224 identifying a particular project and a table 226 identifying a plurality of people associated with the project. In this example, table 226 has a first column 228 that identifies a role for the project 224 and a second column 230 that identifies a person having the corresponding role in column 228.

Figures 2, 3:
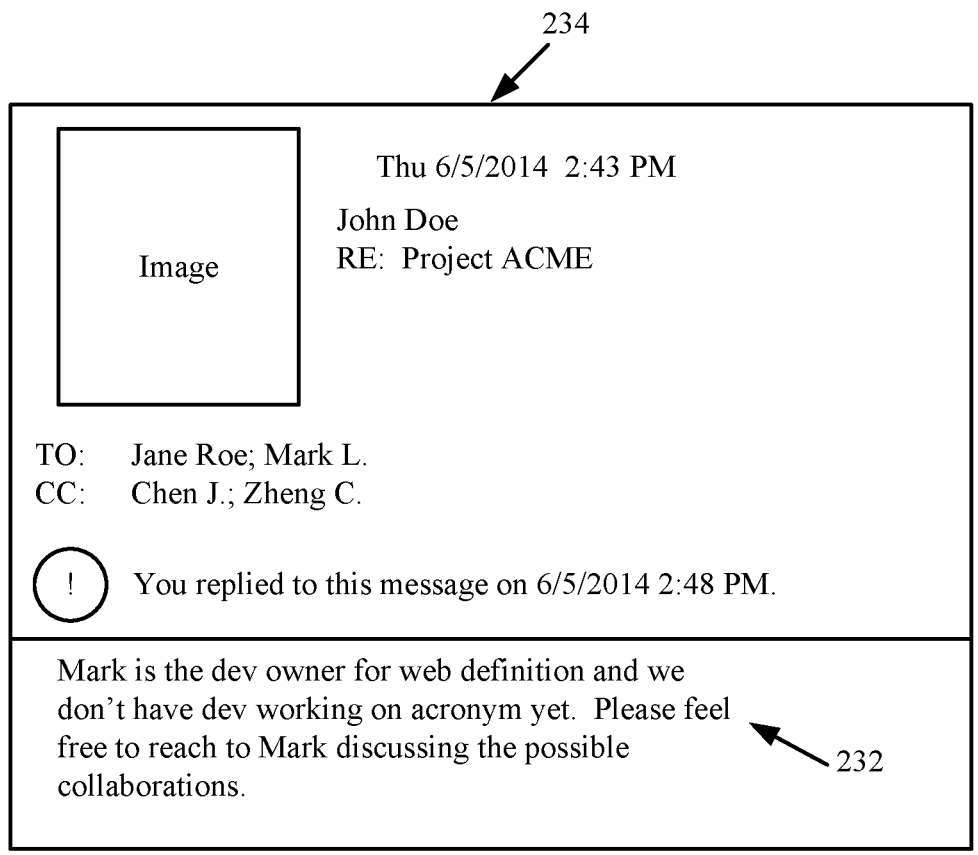

Unstructured data, on the other hand, does not have a fixed set of fields (or other relationship). Examples of unstructured data include, but are not limited to, free text in word processing documents, emails, log entries, multimedia presentations, photos and graphic images, and PDF files, to name a few. As mentioned above, unstructured data can be present within a document that also contains structured or semi-structured data. For example, an email can include structured fields such as a recipient, subject, time, etc., as well as a message body that includes unstructured data, such as free text or other natural language data. FIG. 2-3 illustrates one example of unstructured data in the form of a natural language content 232 within an email 234.

In one example, semi-structured data comprises a form of structured data, but without a strict data model structure. That is, with semi-structured data, tags or other types of markers are used to identify certain elements within the data, but the data doesn't have a rigid structure. For instance, semi-structured data can comprise an unordered list. By way of example, a word processing application can include metadata showing the author's name and date created, with the bulk of the document being unstructured text. Similarly, emails have a sender, recipient, date, time, and other fixed labels added to the unstructured data of the email.

Figures 2, 3, 4:
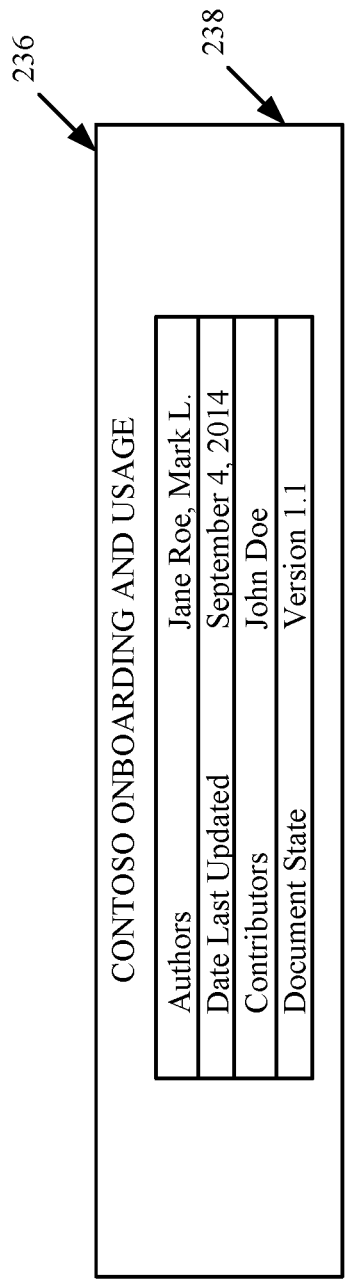

FIGS. 2-4 and 2-5 illustrate examples of semi-structured data. FIG. 2-4 shows content 236 having a list 238, and FIG. 2-5 shows content 240 having a list 242. Lists 238 and 242 provide information without the rigid structure of a table (or other structured data).

FIG. 3 is a flow diagram of one example of a method 250 for crawling, parsing, and classifying content from one or more data sources. For sake of illustration, but not by limitation, method 250 will be described in the context of components 146, 148, and 150.

At step 252, crawler component 146 crawls a data source for content. This can be done in any of a number of ways. For example, crawler component 146 can identify a recently created or updated document.

At step 254, the content is parsed by parsing component 148. This parsing comprises, in one example, identifying any portions of structured content using tags or other structured data identifiers in the data source. Depending on the type of source (the type of document), different types of tags may be available. For example, in an HTML document, HTML tags may identify the existence of tabular data or a list. Using these tags, the content is classified at step 256 as having structured data 258, semi-structured data 260, and/or unstructured data 262.

In one example, after all of the structured data 258 has been identified and extracted from the content, semi-structured data 260 is identified by locating data that can be interpreted in some structured format. For example, a list may be converted into a table. After the semi-structured data 260 is extracted from the content, the remaining data can be classified as unstructured data 262.

At step 264, metadata is generated and stored in metadata store 156 indicative of the parsed content and the classification of that content. At step 266, for any additional content, the method returns to step 254.

Using the classified content, knowledge extraction system 154 is configured to extract knowledge from the content by associating people identified in the content with work attributes (e.g., projects people are working on). In one example, system 154 performs knowledge extraction based on whether the documents have been classified as structure, semi-structured, or unstructured.

The associations can be stored in association store 158 as tuples 162, for example. Each tuple comprises a sequence or list of elements including at least a first element that identifies a person and a second element that identifies an associated work attribute. For example, in one implementation, a triple is generated in the form of <person, role, project>, which associates a particular person with a project keyword and a role of the user for that project. As such, tuples 162 pair people with projects (or other work attributes). Some embodiments are described herein in the context of tuples, such as triples, representing the associations between people and work attributes for the sake of illustration, but not by limitation. It is understood that other types of associations can be utilized.

Entity association system 152 models entities (or objects), and their associations, within architecture 100. In one example, system 152 utilizes a node-edge graph that models all entities (e.g., documents, people, or any other artifact of computing system 102) of an enterprise as nodes on a graph, while all relationships between such entities can be modeled as edges or connections between nodes. An edge or connection between nodes has, in one example, an edge type and an edge properties.

FIG. 4-1 is a diagrammatic view of an extremely simplified version of such a graph.

In FIG. 4-1, User A is modeled in graph 170 at node 272. User A has viewed Document 2 (indicated at reference numeral 274). The fact that User A has viewed Document 2 is reflected in a relationship "viewed" as set forth at edge 276. As such, edge 276 has a "viewed" edge type and can include edge properties that further define this relationship, such as when User A viewed Document 2. In another example, Document 1 (indicated at reference numeral 278) has been shared with User A. This "shared" relationship is set forth at edge 280. As such, edge 280 has a "shared" edge type and can include edge properties that further define this relationship, such as when or how the document was shared with User A.

Users may have relationships to each other. For example, in FIG. 4-1 User B, indicated at reference numeral 282, may have a relationship to User A. For example, User B may directly report to User A, as indicated at edge 284. Similarly, another user (User C—indicated at reference numeral 286) may be a team member with user B. This "team member" relationship is indicated at edge 288. Additionally, while Document 1 has been shared with User A, User C may have modified Document 1. This "modified" relationship between Document 1 and User C is indicated at edge 290. An additional corporate object is indicated at reference numeral 2. Node 292 reflects an email message. Email message 292 has been read by User A and thus is related to User A by virtue of the "read" relationship as indicated at edge 294. Further, message 292 also included Document 1 as an attachment. Accordingly, an edge exists indicating that Document 1 is related to email message 292. Additional objects in the example of FIG. 4-1 are indicated at reference numeral 296, Presentation 1, and 298 (message board discussion). As can be appreciated, this object/relationship modeling of virtually every object in the enterprise allows the capture of significant relationship information. Moreover, as user activities occur, day-to-day, various new edges are created.

Figures 2, 3, 4, 5:
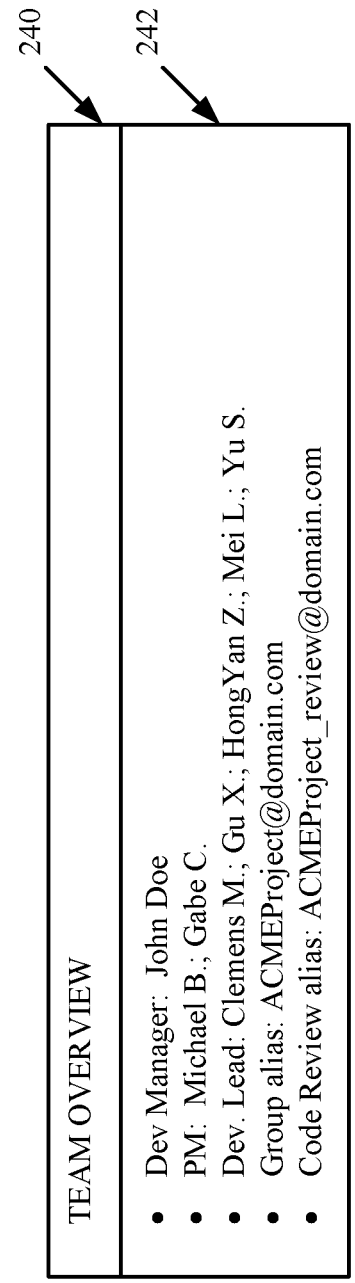
Figure 3:
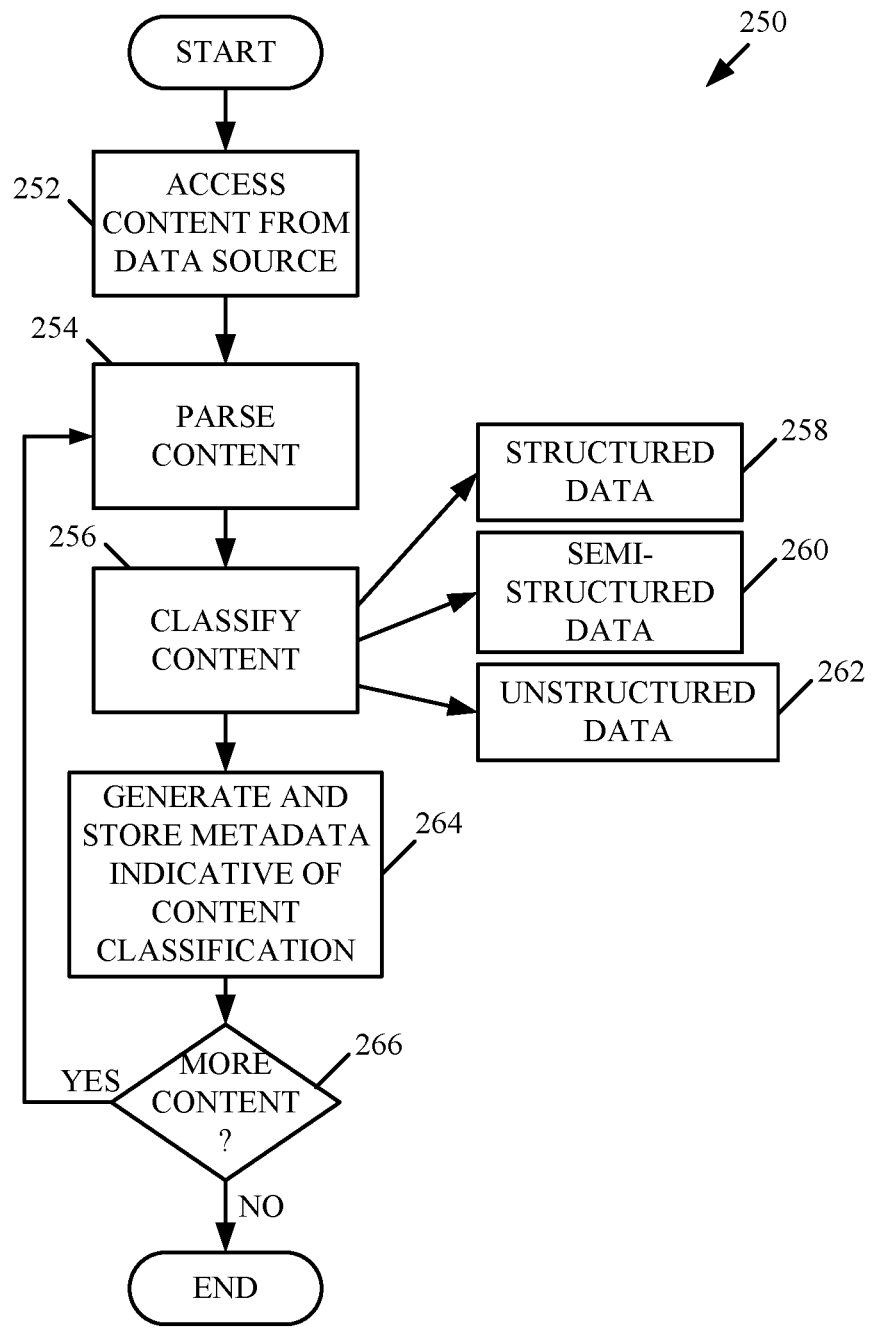
Figures 1, 4:
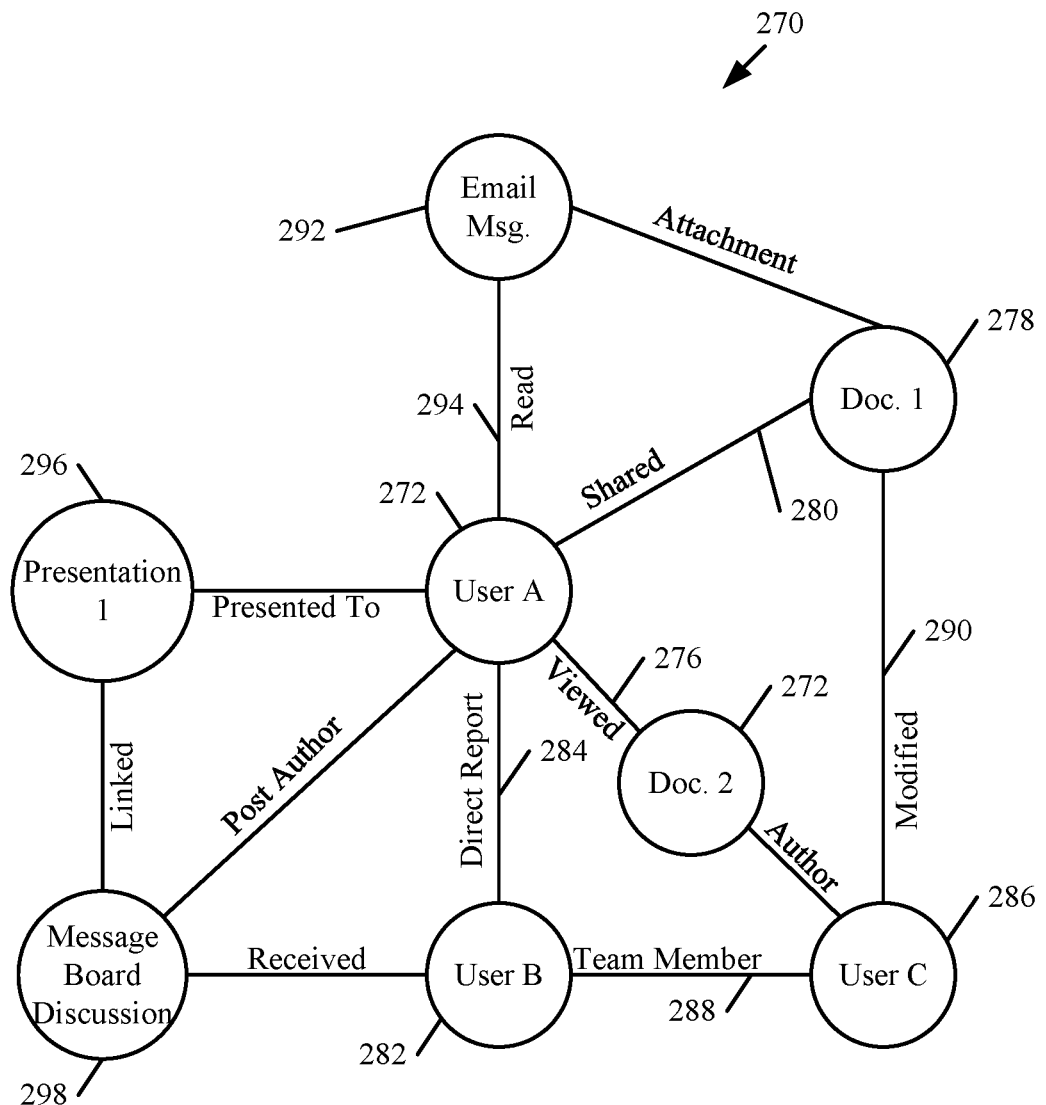
Figures 2, 4:
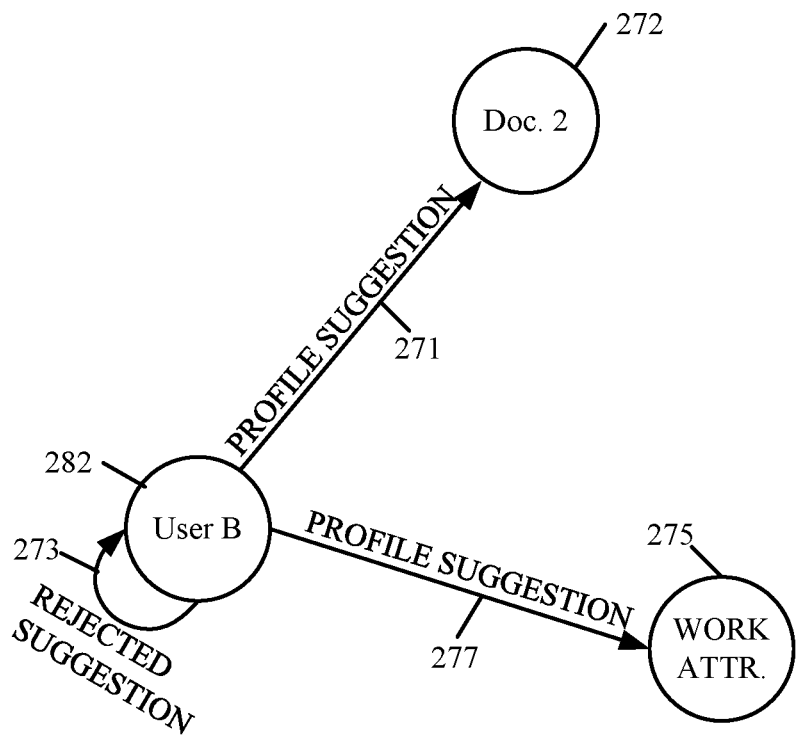
Figure 5:
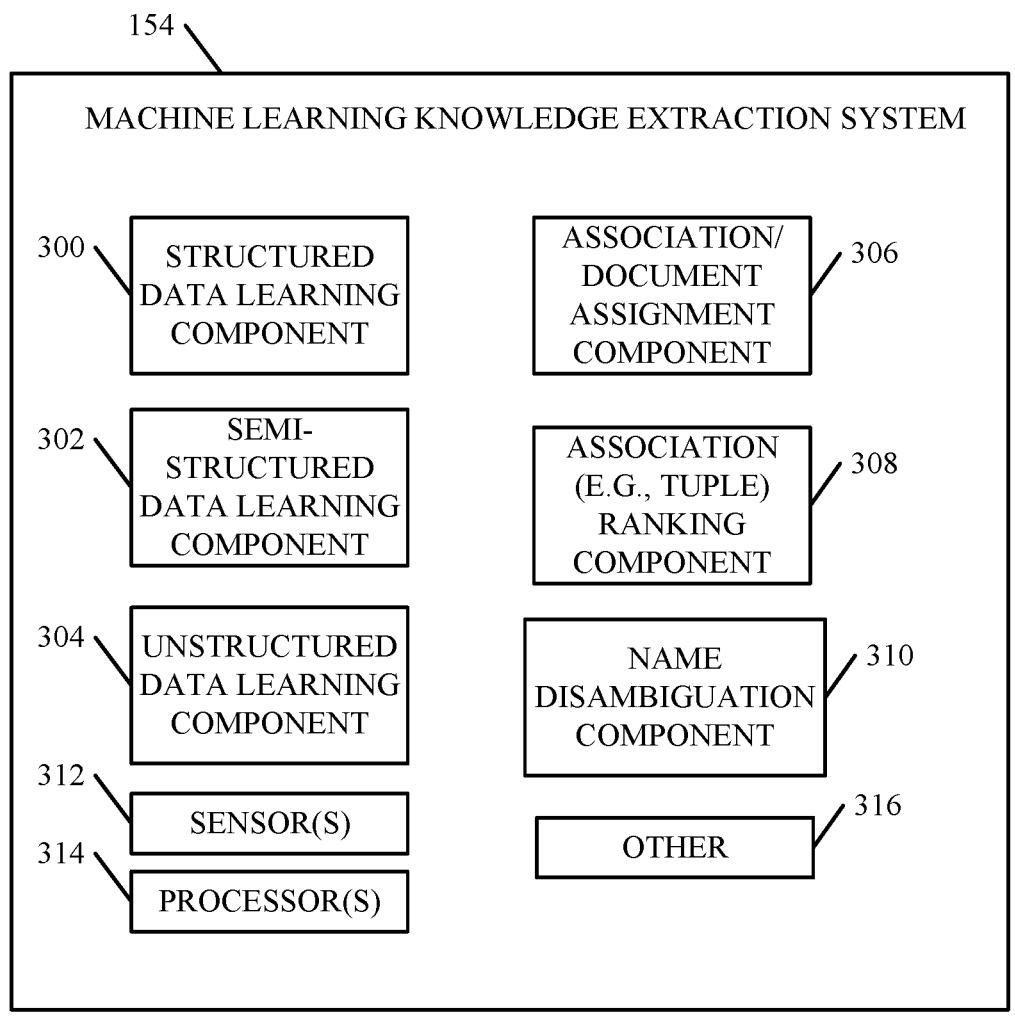

FIG. 5 is a block diagram of one example of knowledge extraction system 154. As shown in FIG. 5, system 154 includes a structured data learning component 300, a semi-structured data learning component 302, and an unstructured data learning component 304 configured to process structured, semi-structured, and unstructured data, respectively. System 154 also includes an association/document assignment component 306, and an association ranking component 308. System 154 can include one or more sensors 312 configured to detect inputs to system 154, one or more processors 314, and can include other items 316 as well.

Component 306 is configured to assign, map, or otherwise associate a person/work attribute association to a particular document (or other data source) from which the association was mined. By way of example, an association created between John Doe and the project "Smart Window for IDE" would be assigned to the document that contained table 200. This is discussed in further detail below.

Association ranking component 308 is configured to rank the associations generated by components 300, 302, and 304.

System 154 also includes a name disambiguation component 310 that is configured to disambiguate names extracted from the data sources. In one example, component 310 uses organization graph 124 to disambiguate a name in a document based on proximity in organizational graph 124. To illustrate, assume that a first name (i.e., "John Smith") is identified in a given document, but there are multiple people in the organization with that same name. As such, the identified name is considered ambiguous as it may refer to several different people. In this case, component 310 can identify a second, non-ambiguous, name (or several other names) in the given document. Then, for each instance of "John Smith" in the organization graph, component 310 determines its proximity to the second name and then selects the closest (or most proximate) instance.

Figures 1, 6:
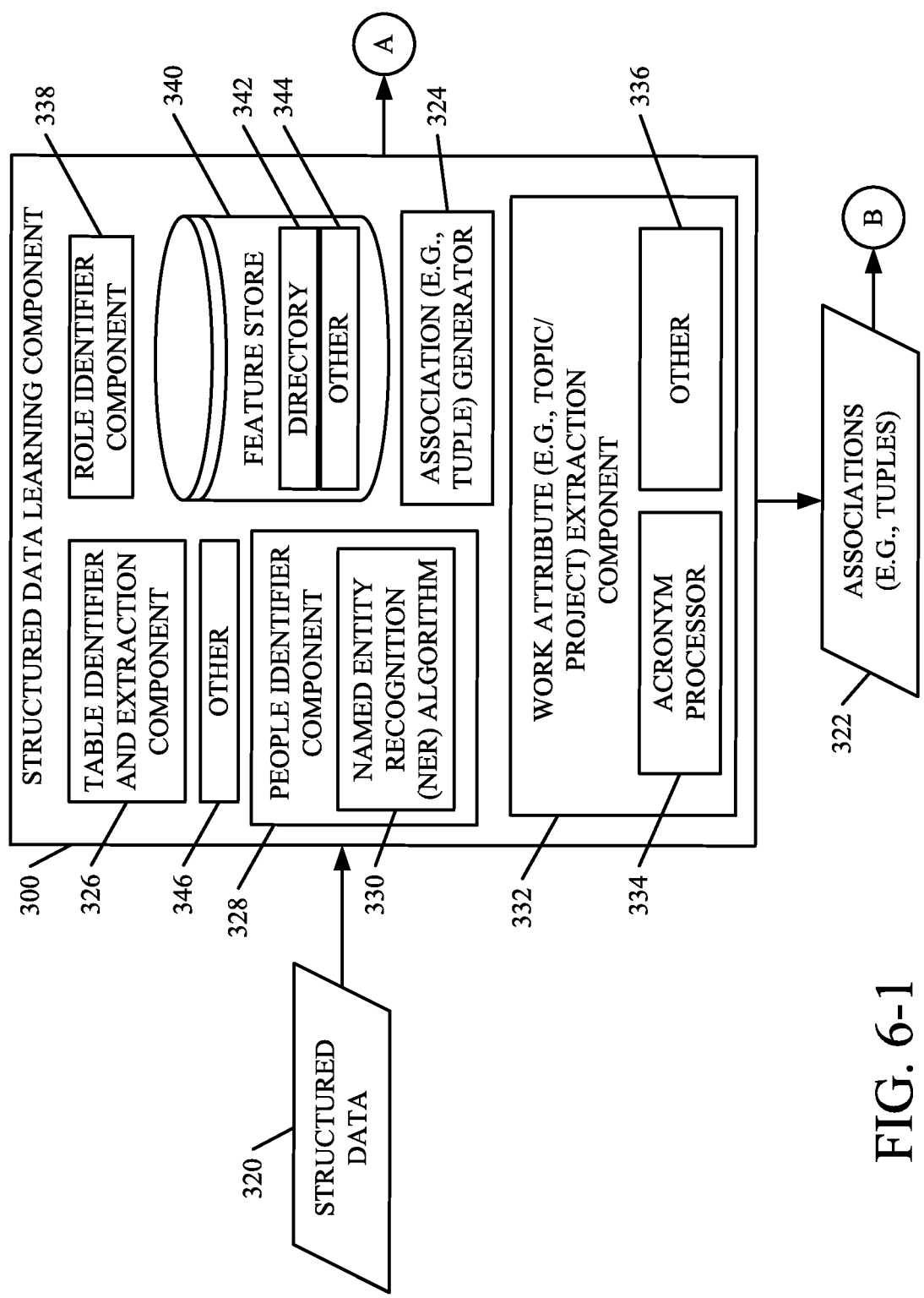
FIG. 6 is a block diagram of data learning components, in one example.
Figures 2, 6:
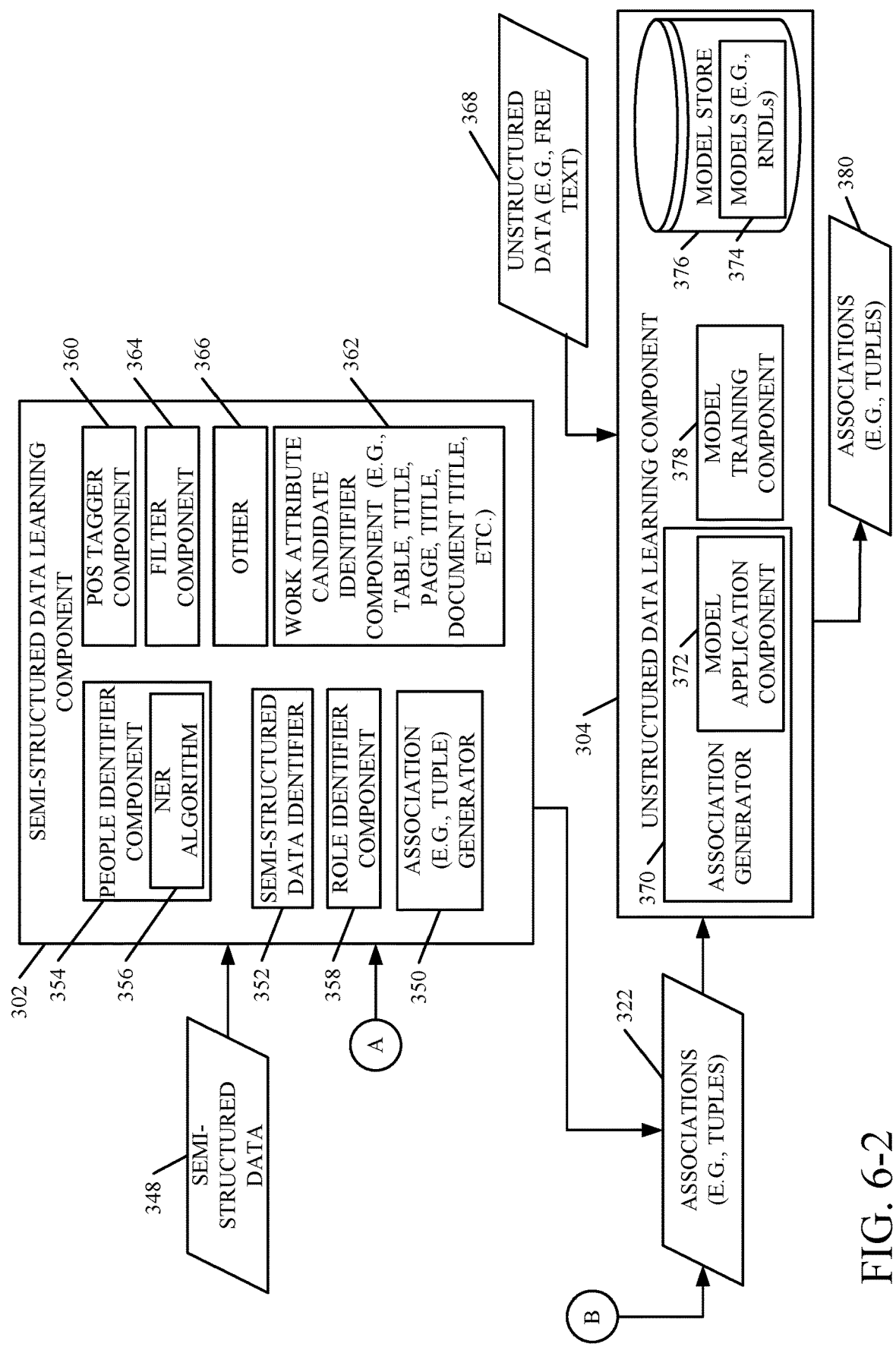

FIGS. 6-1 and 6-2 (collectively referred to as FIG. 6) are block diagrams illustrating one example of components 300, 302, and 304. As shown in FIG. 6, structured data learning component 300 receives structured data 320 and generates associations 322 using an association generator 324. Component 300 includes a table identifier and extraction component 326 configured to identify and extract table data (or other structured data). Component 300 includes a people identifier component 328 configured to identify names (or other identifiers) for people from the extracted data. For example, component 328 can include a named entity recognition (NER) algorithm 330. Component 300 also includes a work attribute (e.g., topic or project) extraction component 332. Component 332 is configured to identify and extract work attributes from the structured data. In one example, component 332 locates project names (or other identifiers) by locating keywords in the extracted data. In this example, component 332 can use any of a variety of resources and/or processes to determine whether a keyword identifies a project (or other work attribute). This can include, but is not limited to, utilizing machine learning algorithms and/or a phrase matching process that matches the keyword against a data store of known project names, for example.

In the illustrated example, component 332 includes an acronym processor 334 and can include other items 336 as well. Component 300 also includes a role identifier component 338 configured to identify a person's role relative to a project (or other work attribute). For example, component 338 can determine that a person was a project manager, a development lead, a developer, etc. for a given project.

Component 300 also includes a features store 340 that stores features used for generating associations 322. The features can include a directory 342, such as a user directory list that can be used as a people dictionary. Features store 340 can include other features 344 as well. Likewise, component 300 can include other items 346.

Semi-structured data learning component 302 receives semi-structured data 348 and generates associations 322 using an association generator 350. Component 302 includes a semi-structured data identifier and extraction component 352, and a people identifier component 354 which can include an NER algorithm 356. Component 302 also includes a role identifier component 358, a part of speech (POS) tagger component 360, a work attribute candidate identifier component 362, and a filter component 364. Component 302 can include other items 366 as well.

Unstructured data learning component receives unstructured data 368 and generates associations 322 using an association generator 370. In the illustrated example, association generator 370 includes a model application component 372 that applies one or more models 374 stored in a model store 376. In one example, models 374 comprise deep learning models, such as, but not limited to, recurrent neural networks. The models 374 are trained using a model training component 378.

Figure 7:
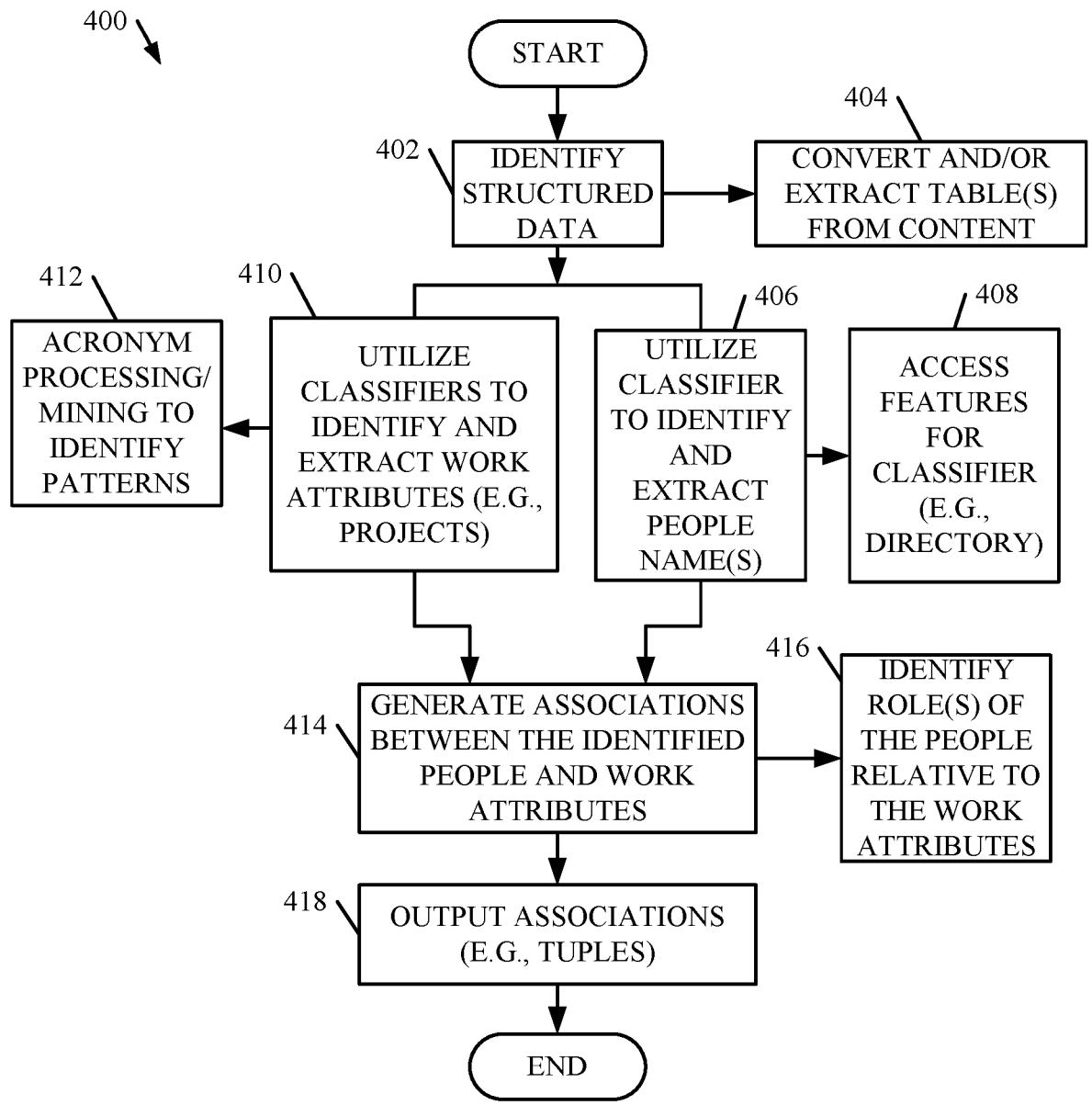
FIG. 7 is a flow diagram of one example of a method 400 for extracting structured data to generate associations.

FIG. 7 is a flow diagram of one example of a method 400 for extracting structured data to generate associations. For the sake of illustration, but not by limitation, method 400 will be described in the context of structured data learning component 300 generating associations 322 in the form of people/work attribute associations.

At step 402, the structured data is identified. For example, step 402 determines that a table exists within the data. The table is extracted from the content at step 404. In one example, at step 404, non-tabular data such as an ordered list is converted into a table for further processing.

At step 406, a classifier is utilized to identify and extract people names from the structured data. For example, a classification model is utilized to determine that a column comprises the names of people using features accessed at step 408. For instance, using a directory of people names and/or aliases, the classifier can identify a ratio of names to non-names in a particular column. If this ratio is above a threshold, the column is identified as a people column in which the words in the column are extracted as names of people. Of course, any other type of features can be accessed at step 408 for identifying people name(s) in the structured data at step 406.

At step 410, which can occur, in one example, simultaneously with step 406, a classifier is utilized to identify and extract work attributes (e.g., projects, topics, skills, or other work attributes). These work attributes can be in the form of keywords or other text. In one example, a classifier model is utilized to identify a column within a table as a project column that contains project names or other identifiers.

In one example, at step 412, acronym processing and mining is performed to identify patterns indicative of the work attributes to be extracted at step 410. For example, step 412 can identify a project acronym that occurs within the project column of the structured data table.

Figure 8:
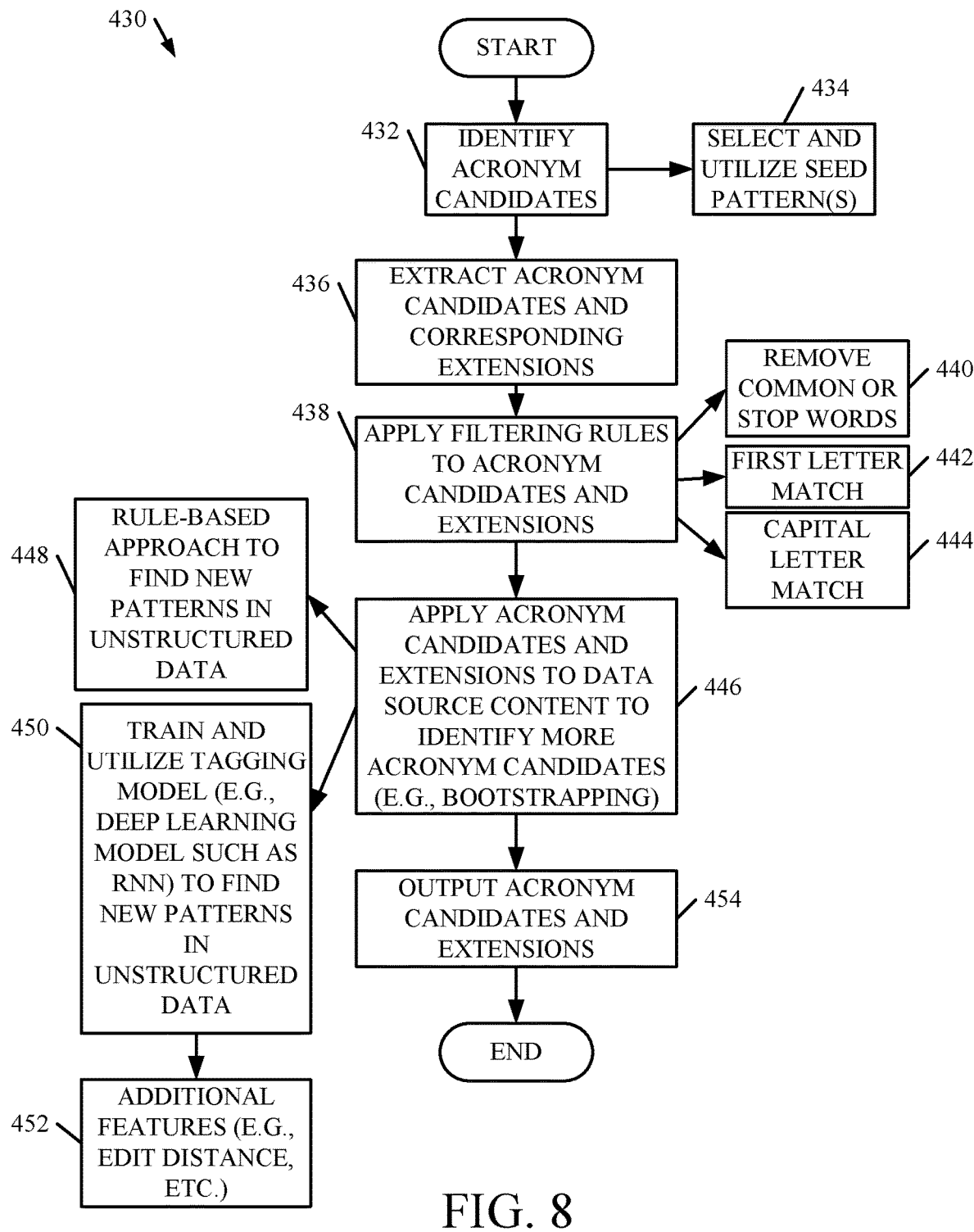
FIG. 8 is a flow diagram illustrating one example of a method for performing acronym mining.

FIG. 8 is a flow diagram illustrating one example of a method 430 for performing acronym mining. For the sake of illustration, but not by limitation, method 430 will be described in the context of acronym processor 332, illustrated in FIG. 6.

At step 432, the method identifies acronym candidates by looking at patterns in the data. For example, step 432 can select and utilize seed patterns at step 434. A seed pattern identifies a pattern in the data that is considered likely to indicate the existence of an acronym. For instance, one seed pattern comprises a particular character sequence (e.g., "aka" and/or "(##)") that follows a phrase. For example, in the text sequences "integrated development environment aka IDE" and "integrated development environment (IDE)", the seed patterns will identify that IDE is a possible acronym.

At step 436, the acronym candidates are extracted along with the corresponding extensions (i.e., "integrated development environment" in the above example). At step 438, the method applies filtering rules to the acronym candidates and corresponding extensions. In one example filtering rule, common or stop words (e.g., "the", "a", "an", etc.) can be removed at step 440. Another filtering rule comprises a letter match rule at step 442 that requires that the first letter appearing in the acronym should match the first letter of the extension for the acronym candidate to be considered an actual acronym. Another example of a filtering rule is a capital letter match rule applied at step 444 which requires that the capital letters in both the acronym candidate and the corresponding extension match for the acronym candidate to be considered an actual acronym.

At step 446, the acronym candidates and corresponding extensions extracted using steps 432-438 is applied to data source content to identify more acronym candidates. For example, a bootstrapping method is utilized to match the acronym candidate/extension pair to data source content. Then, using a rule-based approach, new patterns are located in unstructured data.

Alternatively, or in addition, a tagging model (such as a deep learning model) (e.g., RNN) is trained and utilized to find new patterns in unstructured data using the extracted acronym candidates/extensions from step 446.

In one example, at step 452, additional features (such as edit distance) are applied to the model to tag additional patterns in the unstructured data. For example, new patterns can be found at step 450 that are within a threshold edit distance from the acronym candidates identified at step 446.

At step 454, the acronym candidates and extensions are output as identified work attributes (projects in the present example) for use at step 414 in FIG. 7.

Referring again to FIG. 7, at step 414 the method generates associations between the people identified at step 406 and the work attributes identified at step 410 based on their relationship within the structured data. For example, a given person and work attribute are associated with one another based on their locations within the structured data. For instance, in the context of FIG. 2-1, an example association generated at step 414 associates "John Doe" with the project "Smart Window for IDE", as "John Doe" is located in a people column, "Smart Window for IDE" is located in a project column, and both terms are located in a same row.

Additionally, the role of the person relative to the work attribute can be identified at step 416. For instance, step 416 can identify that "John Doe" was/is a project manager for the identified project, for example based on keywords identified in the structured data (e.g., in a role column).

At step 418, the associations are output by component 300 (i.e., as associations 322). In one example, the associations are stored in association store 158. In one example, the associations are output to unstructured data learning component 304 for use in identifying additional associations in unstructured data, which is discussed in further detail below.

Figure 9:
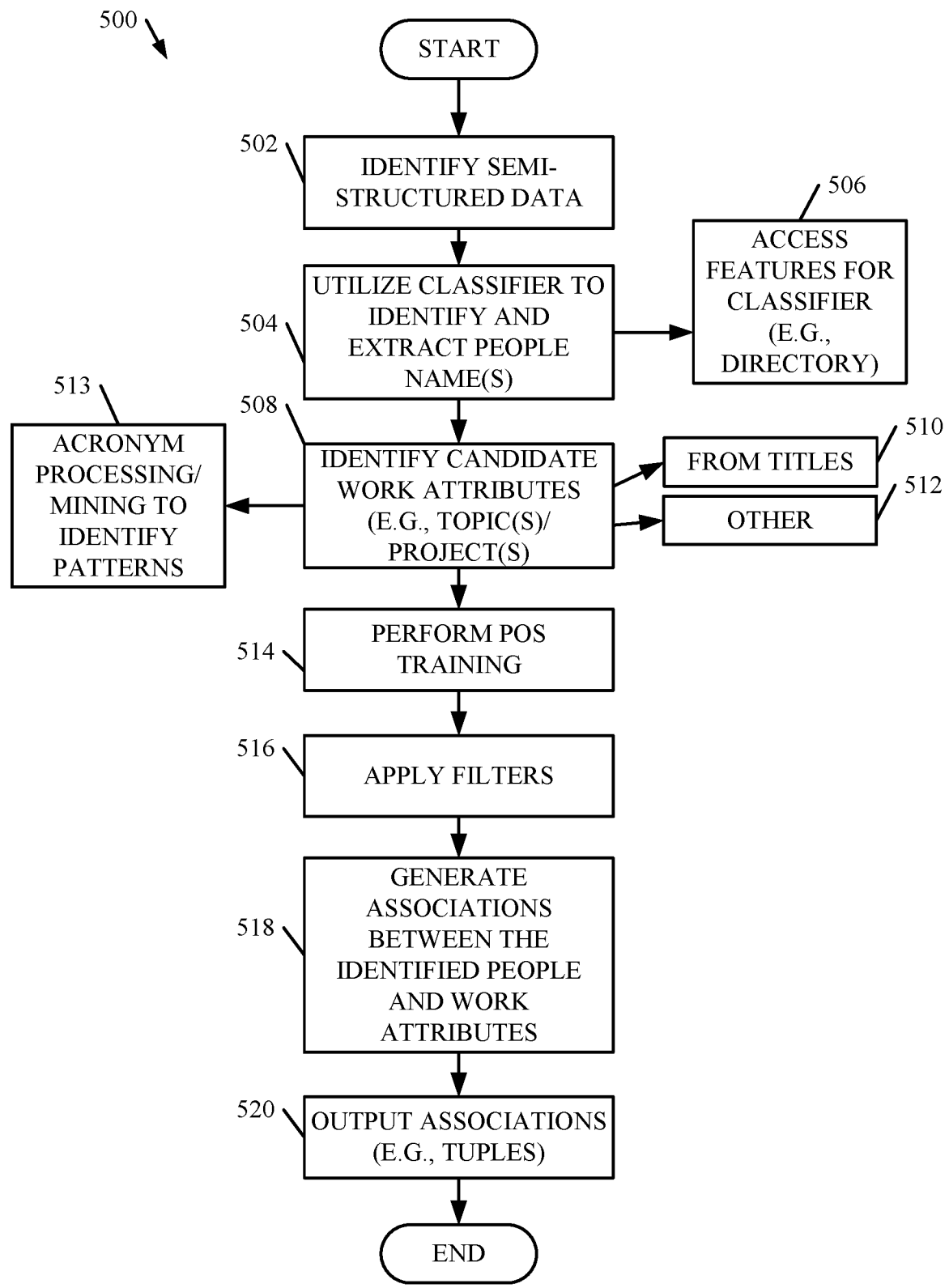
FIG. 9 is a flow diagram of one example of a method for extracting semi-structured data.

FIG. 9 is a flow diagram of one example of a method 500 for extracting semi-structured data and generating associations from the semi-structured data. For the sake of illustration, but not by limitation, method 500 will be described in the context of component 302 generating associations 322. At step 502, the method identifies semi-structured data, for example using tags or other information. In one example, method 502 converts semi-structured data, such as a list, into a table or other structured data. In one example, a list from slides in a multimedia presentation are is identified by bullet points or other identifies, and converted into one or more columns.

At step 504, a classifier is utilized to identify and extract people names from the semi-structured data. The classifier is utilized, in one example, with features accessed at step 506. In one example, a feature used by the classifier can comprise a directory of people names within the organization. In one example, step 504 extracts information from an author field of a document and analyzes it to determine whether it contains the name of a person.

At step 508, the method identifies candidate work attributes from the semi-structured data. In one example, step 508 extracts information from a title of the document at step 510 as it may be likely that the title identifies a project or topic to which the document is directed. Candidate work attributes can be identified using other features or algorithms as well. This is represented by block 512. For example, step 508 can analyze a set of fields (such as items in a column, row, or other structure) to determine a ratio of project names or people names in the fields, a ratio of similar or dissimilar items identified in the fields, or whether each field contains multiple lines. In another example, step 508 can identify a ratio of acronyms in a set of fields or whether the fields contain URLs, people names, or whether the words all start with capital letters. These, of course, are by way of example only.

In one example, acronym processing/mining can be performed on acronyms identified at step 508 to identify patterns. This is indicated at block 513. One example of acronym processing is illustrated in FIG. 8.

At step 514, the method performs part of speech tagging on the extracted information. For example, from a title extracted at step 510, step 514 identified noun phrases.

At step 516, one or more filters are applied to the data to filter out irrelevant terms or other noise. For example, time data such as "July Update" in the title "Deep Learning—July Update" is filtered out at step 516 as time data is not considered relevant in identifying a project or other work attribute.

At step 518, associations are generated between the identified people and work attributes and are output at step 520, for example as associations 322 (shown in FIG. 5).

Figure 10:
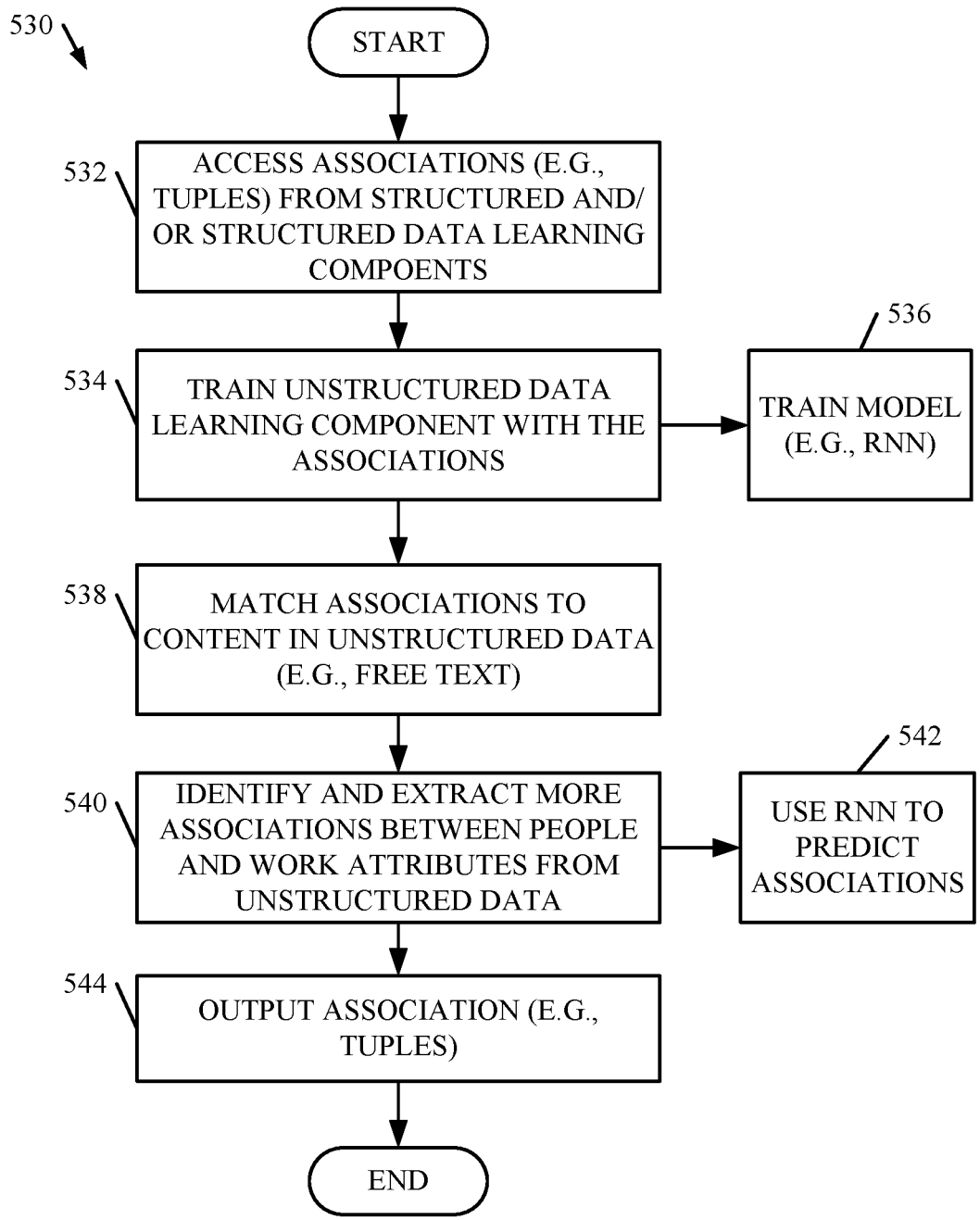
FIG. 10 is a flow diagram illustrating one example of a method for extracting unstructured data.

FIG. 10 is a flow diagram illustrating one example of a method 530 for extracting unstructured data and generating associations from the unstructured data. For sake of illustration, but not by limitation, method 530 will be described in the context of unstructured data learning component 304.

At step 532, the associations from the structured data learning component 300 and semi-structured data learning component 302 are obtained or otherwise accessed. For example, step 532 obtains a set of tuples (e.g., <person/people, role, project> triples). Then, using these associations, the unstructured data learning component is trained at step 534. In the illustrated example, models 374 (e.g., RNNs) are trained by model training component 378 at step 536.

In one example, the associations from step 532 are used to match to content in the unstructured data at step 538. As such, the associations 322 are used as training data for model training component 378 to train models 374 to identify and extract more associations at step 540. In one example, at step 540, the free text is used as input by model application component 372 against models 374 to tag more associations in the free text. In one example, an RNN (or other model) is used to predict the associations in the unstructured data. At step 544, the associations 380 are output. For example, the associations 380 can be stored in association store 158.

Figure 11:
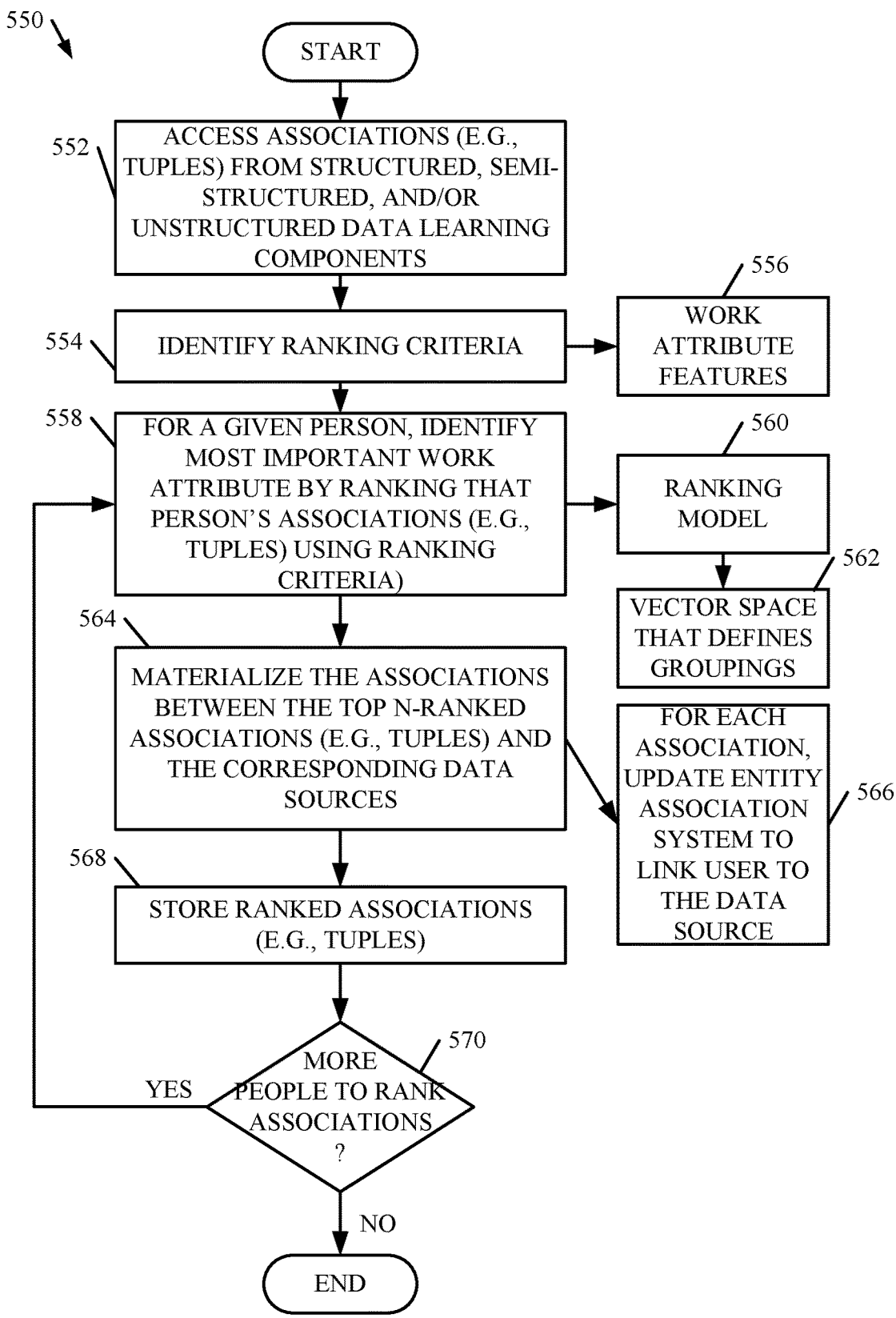
FIG. 11 is a flow diagram illustrating one example of a method for ranking the associations.

In one example, the associations output by components 300, 302, and 304 are ranked, before or after storage in association store 158. FIG. 11 illustrates one example of a method 550 for ranking the associations. For sake of illustration, but not by limitation, method 550 will be described in the context of association ranking component 308 ranking the associations generated by components 300, 302, and 304.

At step 552, the associations from one or more of component 300, 302, and 304 are accessed. For example, in one implementation only associations from structured and semi-structured data are used.

At step 554, ranking criteria are identified. The ranking criteria can comprise features of the work attributes, at step 556. In one example, a work attribute feature comprises the amount of time a person spent on a particular project. As such, an association for a project on which a person worked more often and/or most recently, would be ranked more highly than a project on which the person worked less and/or less recently.

At step 558, for a given person, the most important work attributes are identified by ranking that person's attributes using the ranking criteria. This can include using a runtime ranking model 560 that outputs word/people vectors in a vector space at step 562. In one example of step 562, the ranking model is trained to rank people that worked on similar projects more closely together. Alternatively, or in addition, the ranking model 560 can be trained to group similar projects more closely together in the ranking.

At step 564, the top n-ranked associations are identified and, further associated with the corresponding data source. It is, for each couple (or other association), step 564 identifies the document (or other data source) from which the tuple was extracted and then materializes that association using association/document assignment component 306.

In one example, at step 566, for each person/work attribute association, the entity association system 152 is updated to link the user to the data source. By way of illustration, assuming that, in the case of the node-edge graph shown in FIG. 4-1, user B (node 282) has been associated with a project (i.e., "project ACME") discussed in Document 2 (node 272). In this case, an edge is created between nodes 282 and 272 that represents this association. This is shown in FIG. 4-2, which illustrates a portion of node edge graph 270.

As shown in FIG. 4-2, edge 271 has a "profile suggestion" edge type and includes edge properties that define the profile suggestion (e.g., which project(s), skill(s), or other work attribute(s) are suggestions for user B's profile). As discussed in further detail below, this edge can be used in the work attribute surfacing process to identify the corresponding data source.

In one example, a single edge can accumulate a plurality of profile suggestions. For instance, edge 271 can represent two different projects (e.g., Project Alpha and Project Beta) extracted from Document 2 in association with User B. In another instance, edge 271 can represent a project and a skill or other work attribute. As such, separate edges do not need to be created for each profile suggestion.

Alternatively, or in addition, a work attribute can be represented as its own node in the node-edge graph. This is represented at node 275. For example, node 275 can represent a particular skill, experience, education, training, project, etc. Edge 277 connects User B with that work attribute as a profile suggestion.

In one example, a record of rejected profile suggestions is maintained and used during the profile suggestion process to prevent rejected profile suggestions from being surfaced to the user. For instance, in FIG. 4-2 a "rejected suggestion" edge 273 can be used to represent one or more suggested work attributes that the user has rejected. In one example, the "rejected suggestion" edge 273 can accumulated a plurality of rejected work attributes, rather than generating a separate edge for each rejected work attribute.

Using rejected suggestion edges to surface work attributes is discussed in further detail below. Briefly, however, assume user B rejects a profile suggestion for Project Alpha represented by edge 271. Then, edge 273 is created to connect node 282 to itself, and includes edge properties that identifies the rejected work attribute (i.e., Project Alpha in this example) represented by edge 271. This can include removing edge 271, if desired. In this example, because of edge 273, surfacing system 136 will not surface User B will a profile suggestion for Project Alpha even if Project Alpha is mined as a suggestion from another data source.

Of course, edge 271 can remain in the node-edge graph 270 along with edge 273. As such, in one example, User B can later remove edge 273, upon which the profile suggestion represented by edge 271 would be available for surfacing to User B At step 568, the ranked associations are stored, for example in association store 158. At step 570, the method determines whether there are more people for which to rank the associations.

Referring again to FIG. 1, once the associations have been identified, user profile information surfacing system 136 can surface the work attributes for inclusion in user profiles 140. In the illustrated example, system 136 includes a people/ work attribute association identification component 164 that identifies the associations between a person and the work attributes from association store 158. Then, the work attributes for a given user can be incorporated into the user's profile 140. This can be done automatically, or in response to user input.

For example, system 136 includes a suggestion generator component 166 that is configured to generate suggestions for work attributes to be incorporated into a user profile (e.g., for user 112). For instance, a display system controller 168 can control display system 128 and user interface component 106 to generate user interface displays 108 that surface the work attributes as profile suggestions 170. In the illustrated example, system 136 includes a permission system 172, which is discussed in further detail below, and can include other items 174 as well.

Figures 1, 12:
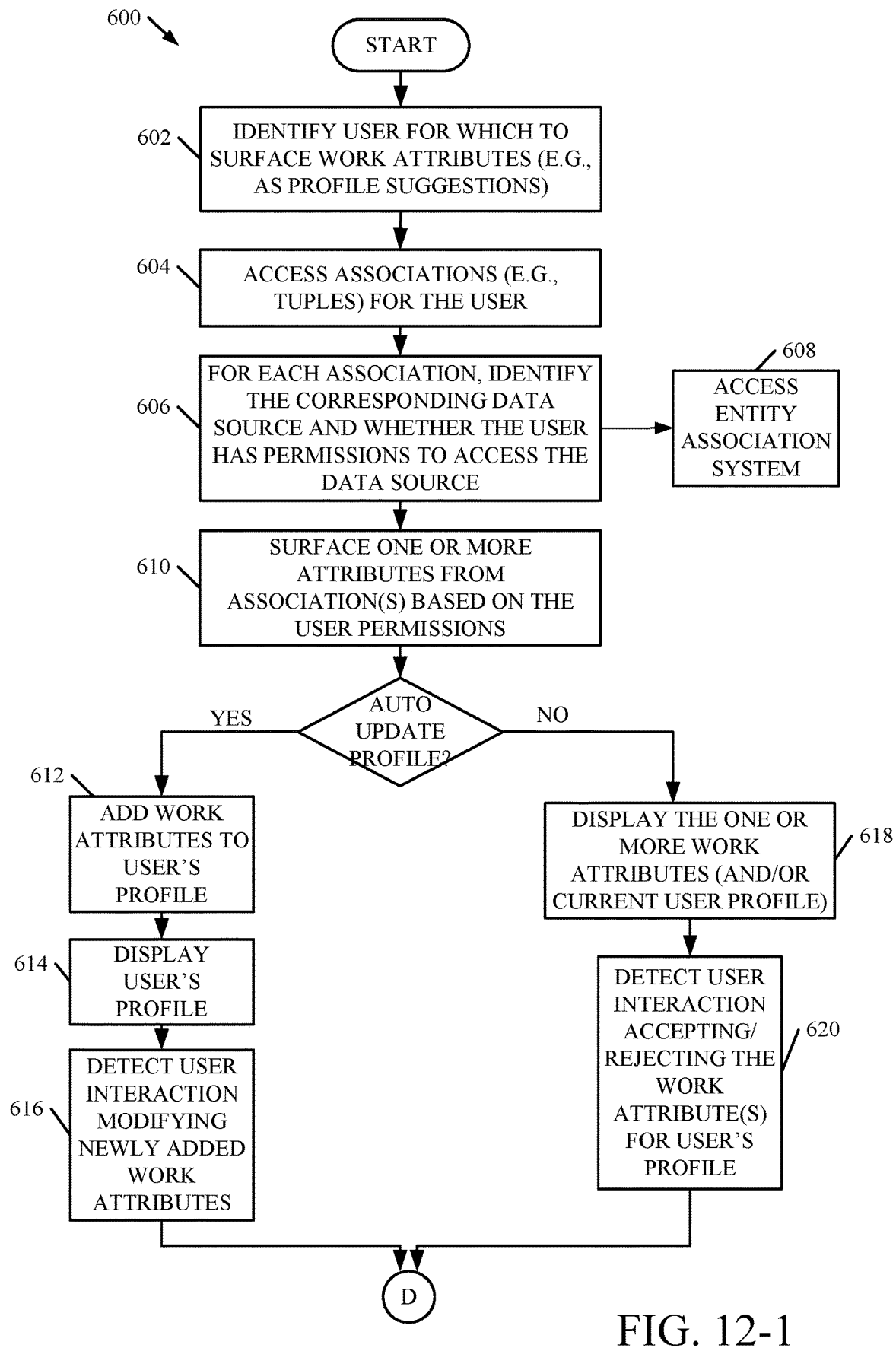
FIG. 12 is a flow diagram of one example of a method for surfacing work attributes.
Figures 2, 12:
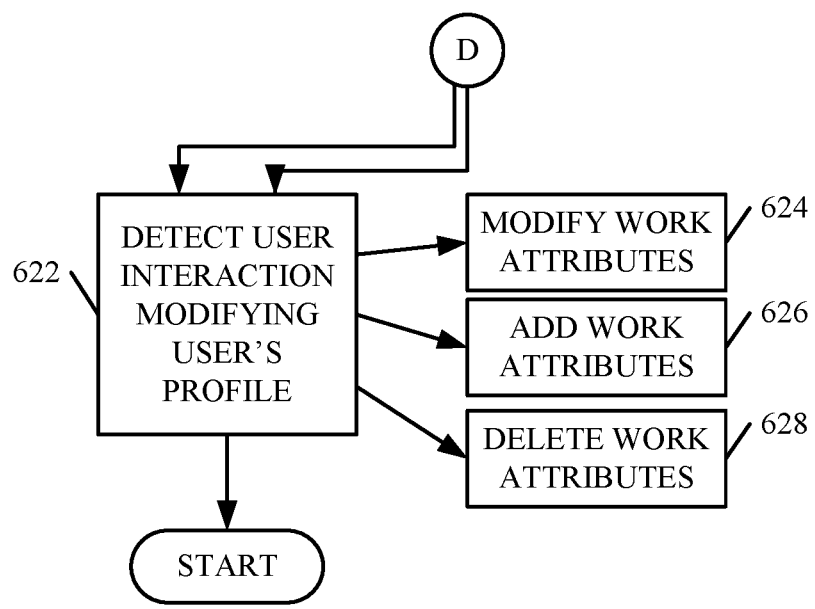

FIGS. 12-1 and 12-2 (collectively referred to as FIG. 12) illustrate a flow diagram of one example of a method 600 for surfacing work attributes. For the sake of illustration, but not by limitation, method 600 will be described in the context of system 136 surfacing associations from association store 158.

At step 602, the method identifies the user for which to surface work attributes, for example by the user providing authenticating information. Component 164 then identifies the work attributes associated with the user from association store 158.

At step 604, the associations for the user, which can be ranked, are accessed from association store 158 and, at step 606, the corresponding data source is identified for each of the associations. Further, step 606 can also identify whether the user has permissions to access the corresponding data source.

For sake of illustration, and with respect to the example discussed above for step 566, assume that step 602 identifies User B (node 282 in FIG. 4-2). Then, step 604 identifies any profile suggestions based on the edges from node 282. This includes identifying "profile suggestion" edges (e.g., edge 271 for Project Alpha and/or edge 277) and "rejected suggestion" edges (e.g., edge 273). Then, for any profile suggestions that have not been rejected by User B, step 606 uses the edges and their properties to identify the corresponding data source from which the profile suggestion was extracted (i.e., Document 2 in the present example, which was the source of the User B/project Alpha association).

Further, in this example, assume that Document 2 is considered confidential and has sensitivity rules (or other permissions) that do not allow some users to access the data within Document 2. Step 606 determines whether User B can access Document 2 based on these permissions. This can be done in any of a variety of ways. For example, Document 2 represented at node 272 can, itself, contain a set of permissions that are analyzed at step 606. Of course, user access permissions can be determined in other ways, as well.

At step 610, the method surfaces one or more work attributes for the associations based on the user permissions.

For example, step 610 only surfaces work attributes that were mined from data sources for which the user has access permissions. This can prevent confidential information, for which that user does not have access permissions, from being surfaced to the user.

In one example, surfacing system 136 includes a profile update system controller that is configured to control profile update system 138 to update the user's profile with the one or more work attributes surfaced at step 610. This can be done automatically and/or in response to user input relative to a profile suggestion.

For example, the surfaced work attributes can be used to automatically update the user's profile 140 at step 612. For example, the top n-ranked work attributes for the user are added to the user's profile.

At step 614, the user's profile can be displayed. Then, a user interaction can be detected that modifies the newly added work attributes. For example, the user may determine that they want to remove the newly added work attribute, modify the work attribute, or change the attribute.

In one example, at step 618, the work attribute(s) can be displayed as suggestions for updating the user's profile, along with the current user profile. At step 620, a user interaction with the user input mechanism(s) is detected to accept or reject the work attribute for the user's profile. If the work attribute is accepted, the work attribute is added to the user's profile. In one example, if the work attribute is rejected by the user, a "rejected suggestion" edge (e.g., edge 273) is created in a node-edge graph so that the rejected work attribute is not again surfaced in the future.

For instance, a profile suggestion for the top n-ranked work attributes for the user are returned as actionable user interface elements that, upon actuation by the user, automatically modifies the user's profile with the corresponding work attribute. This can include adding the corresponding work attribute (e.g., project ACME) and/or other information pertaining to the work attribute (e.g., additional information describing project ACME that was extracted from data source(s)).

Alternatively, or in addition, the work attribute suggestion is displayed along with a user input mechanism that allows the user to manually enter user profile information. For instance, the user interface display displays a suggested project (e.g., project ACME) along with a text entry field (or other user input mechanism) that allows the user to enter the profile information manually.

At step 622, further user interactions can be detected that modify the user's profile. This can include modifying work attributes at step 624, adding work attributes at step 626, or deleting work attributes at step 628.

It can thus be seen that the present discussion provides significant technical advantages. For example, it provides a data source mining system that uses a machine learning knowledge extraction system to extract knowledge from data sources that can be used to update user profiles. This can facilitate rich user profiles for providing an expertise location system, for example. Further, the data source mining system can mine data from a variety of different data structure types.

Further, in described embodiments, the user experience can be improved relative to surfacing relevant work attributes and expertise and reduce processing bandwidth, such as by reducing the number of round trips required to the underlying data store in attempting to surface work related attributes for people.

The present discussion mentions processors and servers. In one example, the processors and servers include computer processors with associated memory and timing circuitry, not separately shown. They are functional parts of the systems or devices to which they belong and are activated by, and facilitate the functionality of the other modules, components and/or items in those systems.

Also, a number of user interface displays have been discussed. They can take a wide variety of different forms and can have a wide variety of different user actuatable input mechanisms disposed thereon. The user actuatable input mechanisms sense user interaction with the computing system. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores are also discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 13:
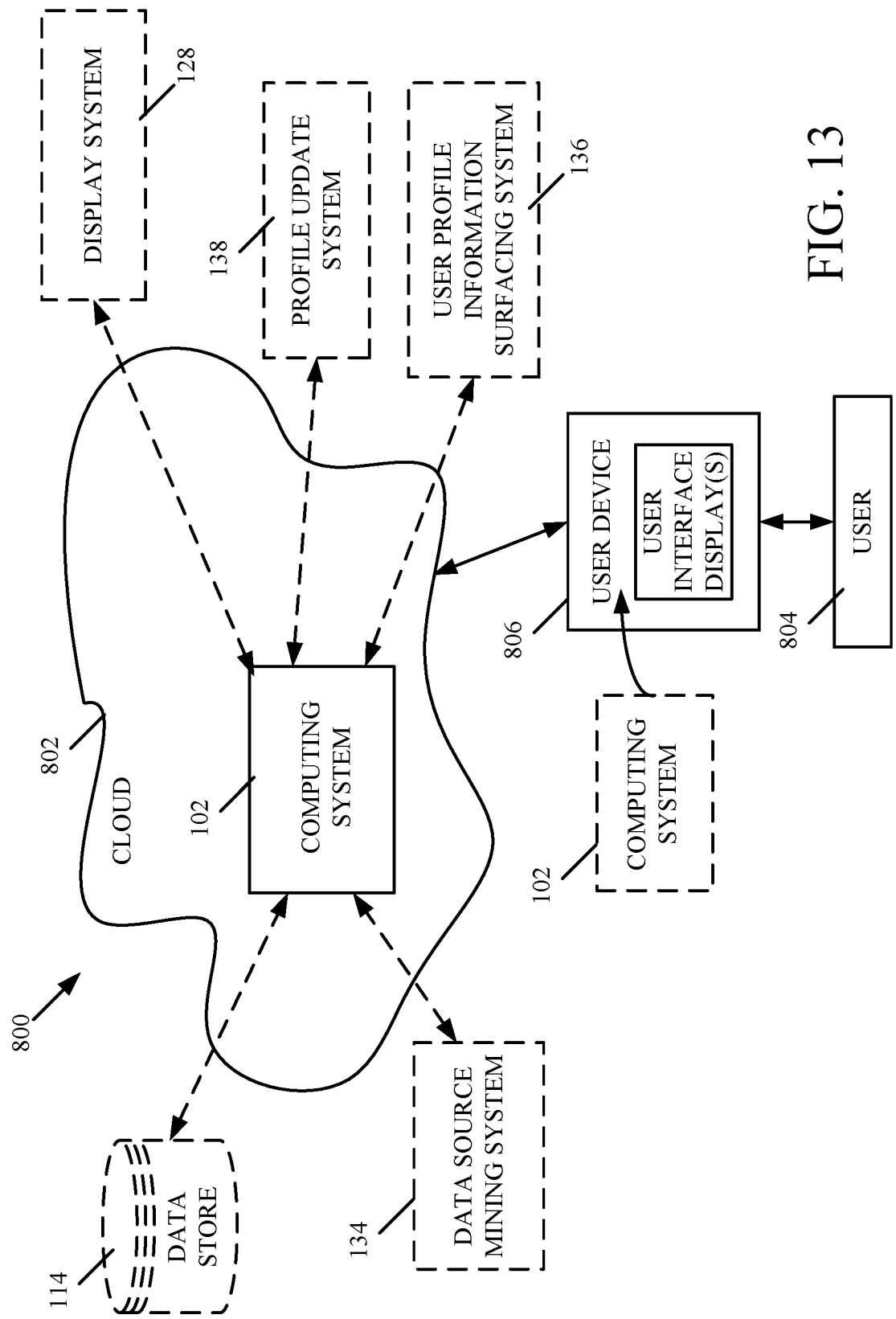
FIG. 13 is a block diagram showing one example of the architecture illustrated in FIG. 1, deployed in a cloud computing architecture.

FIG. 13 is a block diagram of architecture 100, shown in FIG. 1, except that its elements are disposed in a cloud computing architecture 800. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software, modules, or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the modules, components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 13, some items correspond to those shown in FIG. 1 and they are similarly numbered. FIG. 13 specifically shows that computing system 102 is located in cloud 802 (which can be public, private, or a combination where portions are public while others are private). Therefore, a user 804 (e.g., user 112) uses a user device 806 to access system 102 through cloud 802.

FIG. 13 also depicts another embodiment of a cloud architecture. FIG. 13 shows that it is also contemplated that some components of computing system 102 are disposed in cloud 802 while others are not. In one example, data store 114 can be disposed outside of cloud 802, and accessed through cloud 802. In another example, display system 128 can be disposed outside of cloud 802. In another example, data source mining system 134 can be disposed outside of cloud 802. In another example, user profile information surfacing system 136 can be disposed outside of cloud 802. In another example, profile update system 138 can be disposed outside of cloud 802. Regardless of where they are located, system 102 components can be accessed directly by device 806, through a network (either a wide area network or a local area network), they can be hosted at a remote site by a service, or they can be provided as a service through a cloud or accessed by a connection service that resides in the cloud. FIG. 13 also shows that system 102, or parts of it, can be deployed on user device 806. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
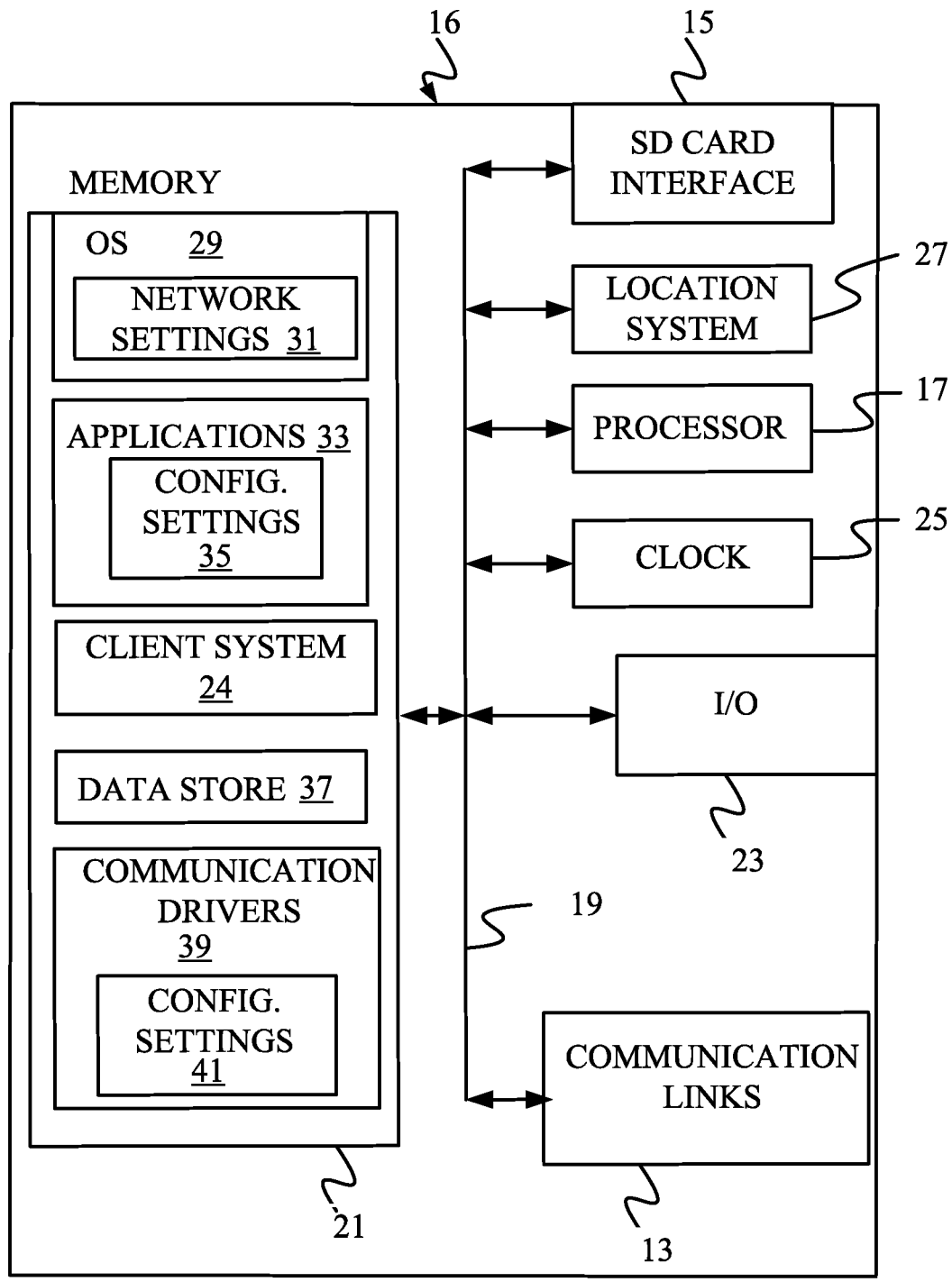
FIGS. 14-18 show various examples of mobile devices that can be used with the architecture shown in FIG. 1.

FIG. 14 is a simplified block diagram of one example of a handheld or mobile computing device that can be used as a user's or client's hand held device 16, in which the present system (or parts of it) can be deployed. FIGS. 15-18 are examples of handheld or mobile devices.

FIG. 14 provides a general block diagram of the components of a client device 16 that can run modules or components of architecture 100 or that interacts with architecture 100, or both. In the device 16, a communications link 13 is provided that allows the handheld device to communicate with other computing devices and in some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems are received on a removable Secure Digital (SD) card that is connected to a SD card interface 15. SD card interface 15 and communications link 13 communicate with a processor 17 (which can also embody processor(s) 104 from FIG. 1) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 comprises a real time clock component that outputs a time and date. It can also provide timing functions for processor 17.

Location system 27 includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. It can also store a client system 24 which can be part or all of architecture 100. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other modules or components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 15:
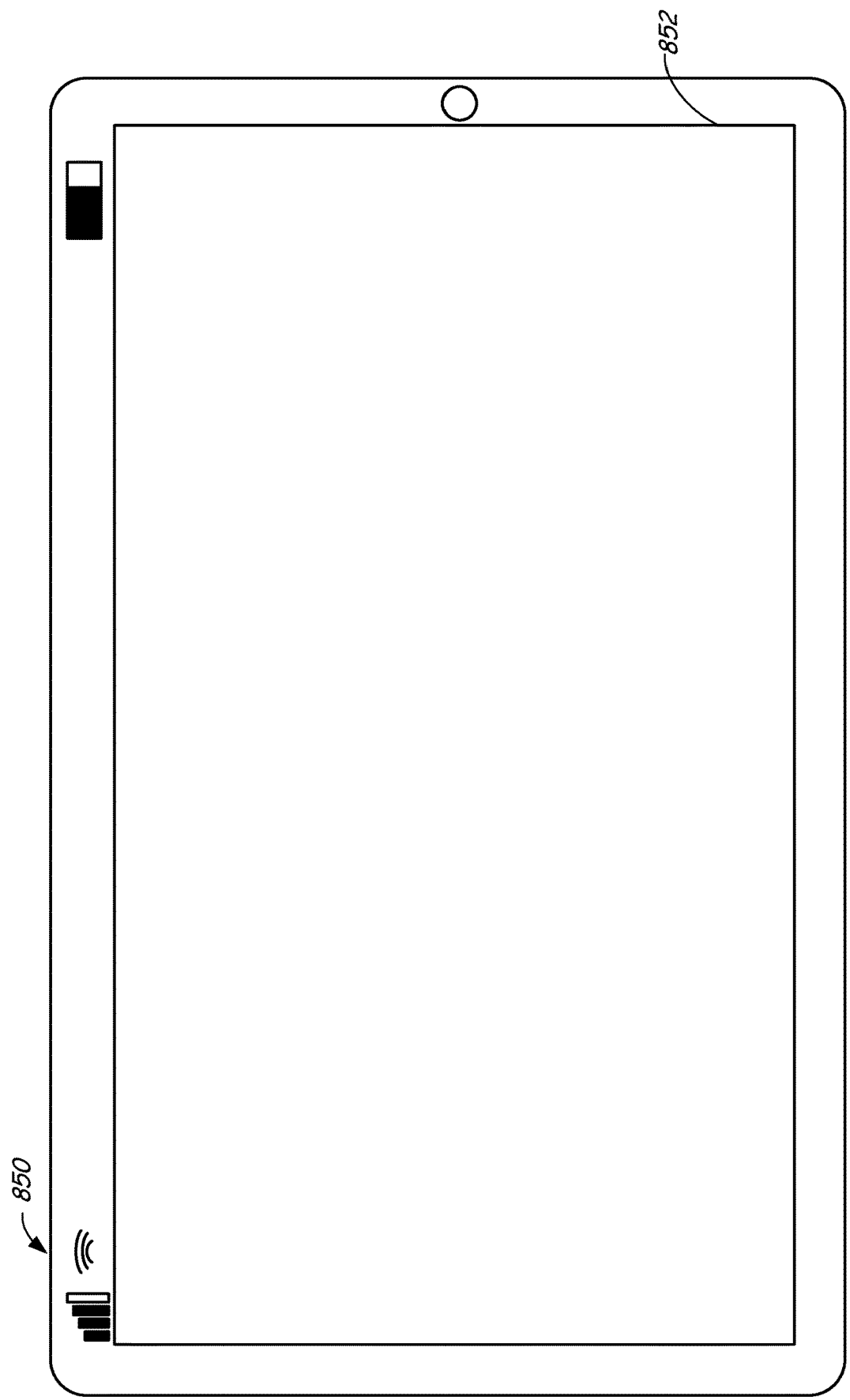

FIG. 15 shows one example in which device 16 is a tablet computer 850. In FIG. 15, computer 850 is shown with user interface display screen 852. Screen 852 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also receive voice inputs as well.

Figure 16:
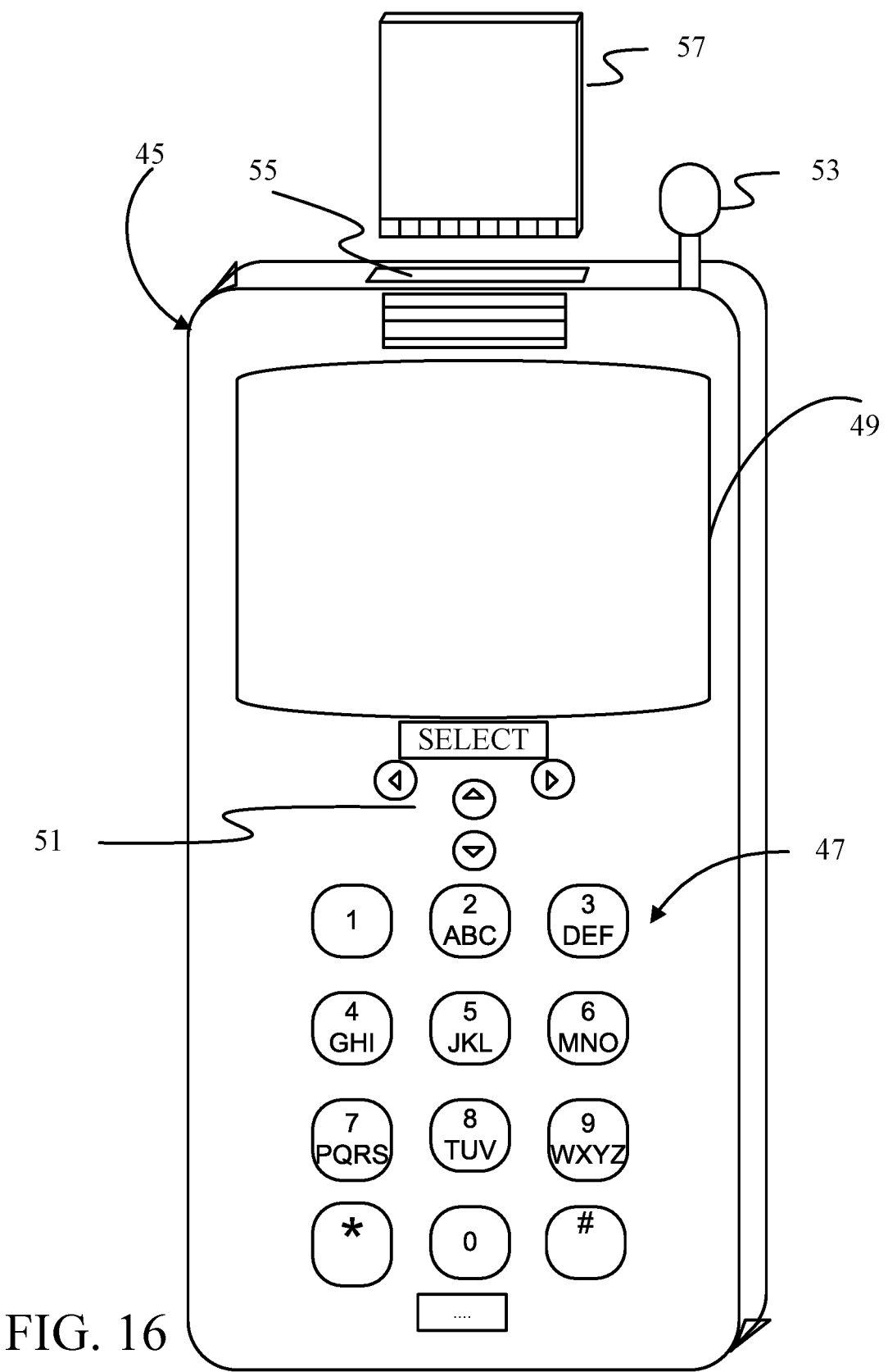
Figure 17:
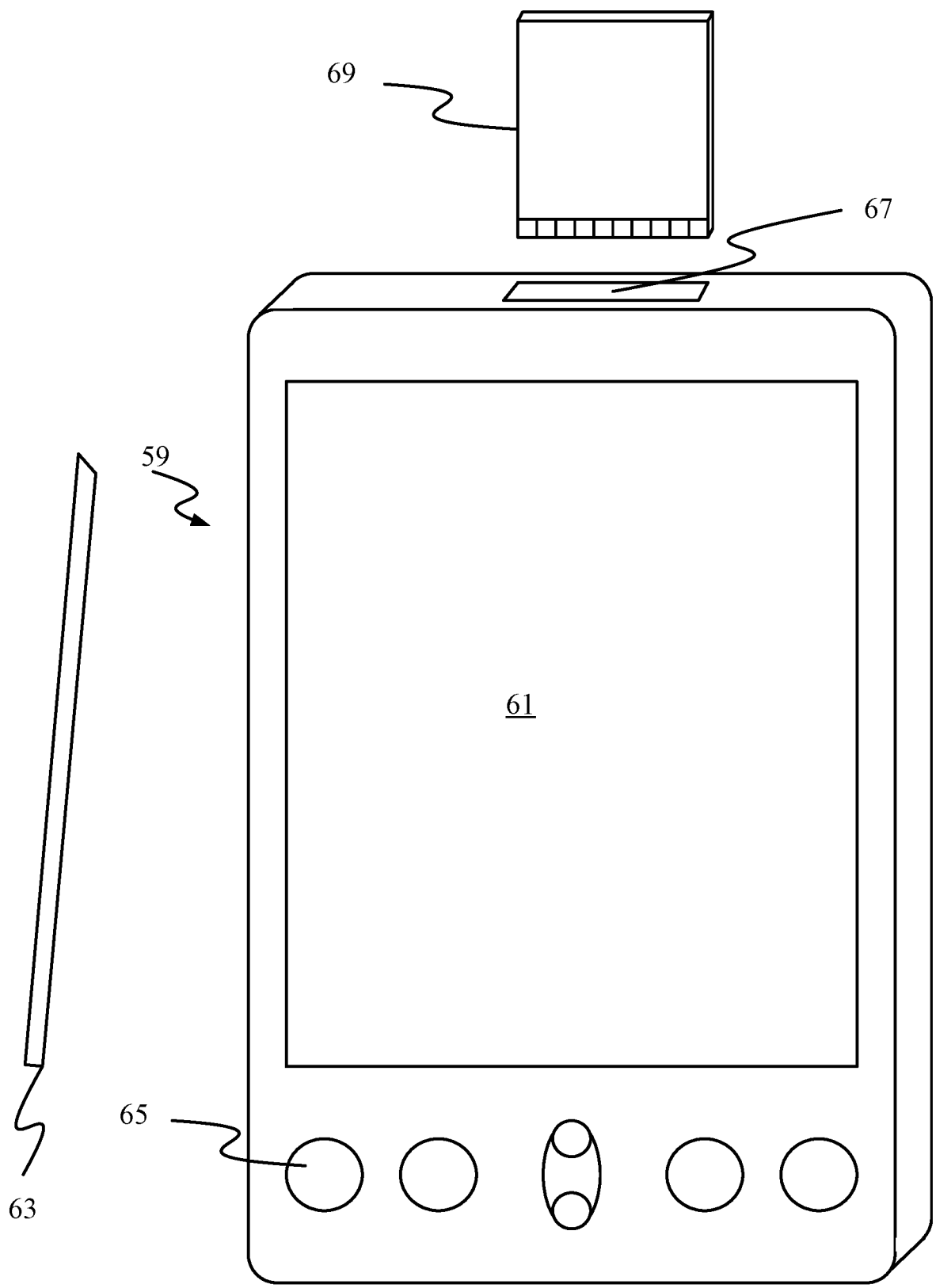

FIGS. 16 and 17 provide additional examples of devices 16 that can be used, although others can be used as well. In FIG. 16, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some examples, phone 45 also includes a Secure Digital (SD) card slot 55 that accepts a SD card 57.

The mobile device of FIG. 17 is a personal digital assistant (PDA) 59 or a multimedia player or a tablet computing device, etc. (hereinafter referred to as PDA 59). PDA 59 includes an inductive display screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display screen 61, and allow the user to change applications or select user input functions, without contacting display screen 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one example, mobile device 59 also includes a SD card slot 67 that accepts a SD card 69.

Figure 18:
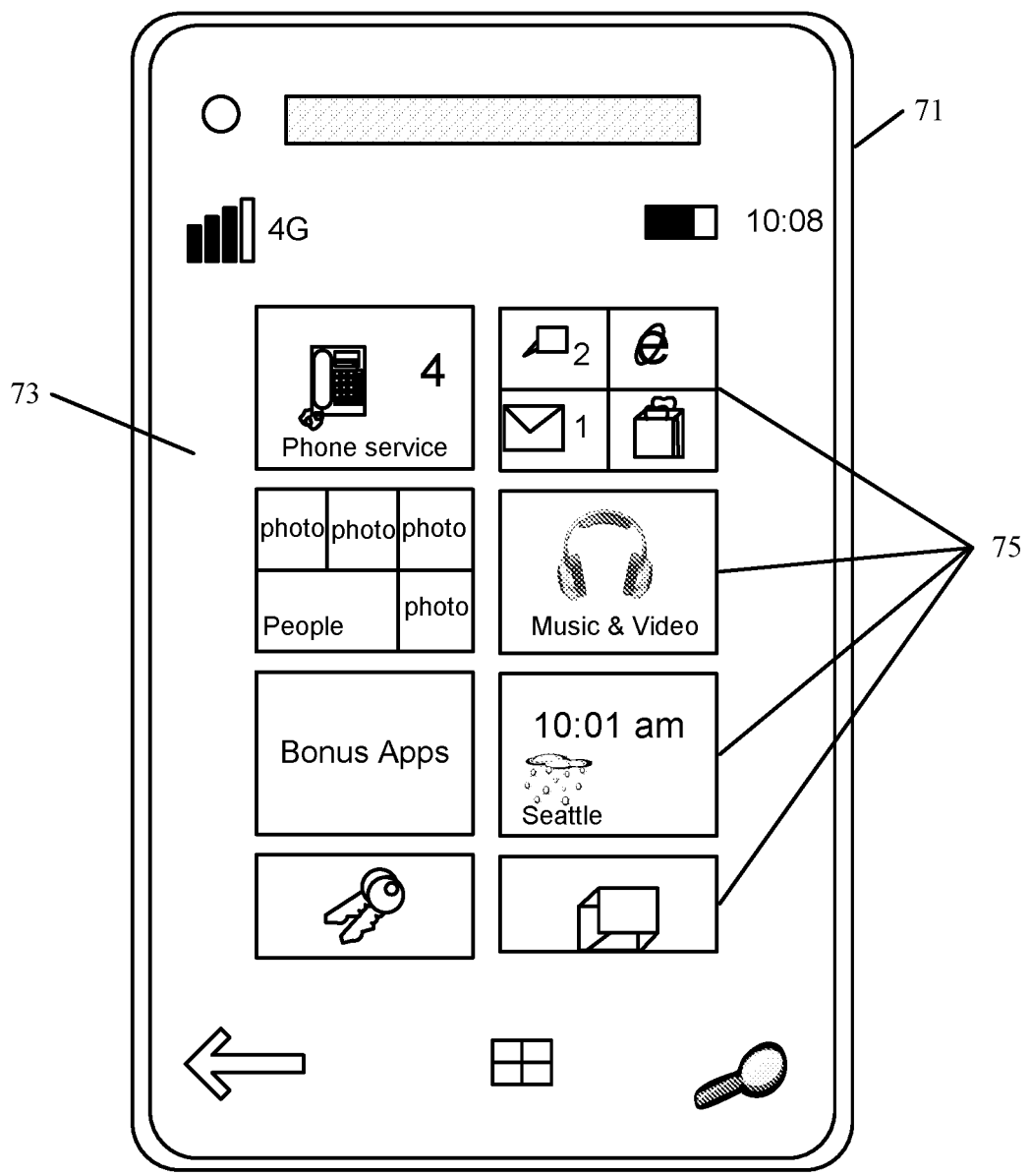

FIG. 18 is similar to FIG. 16 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 19:
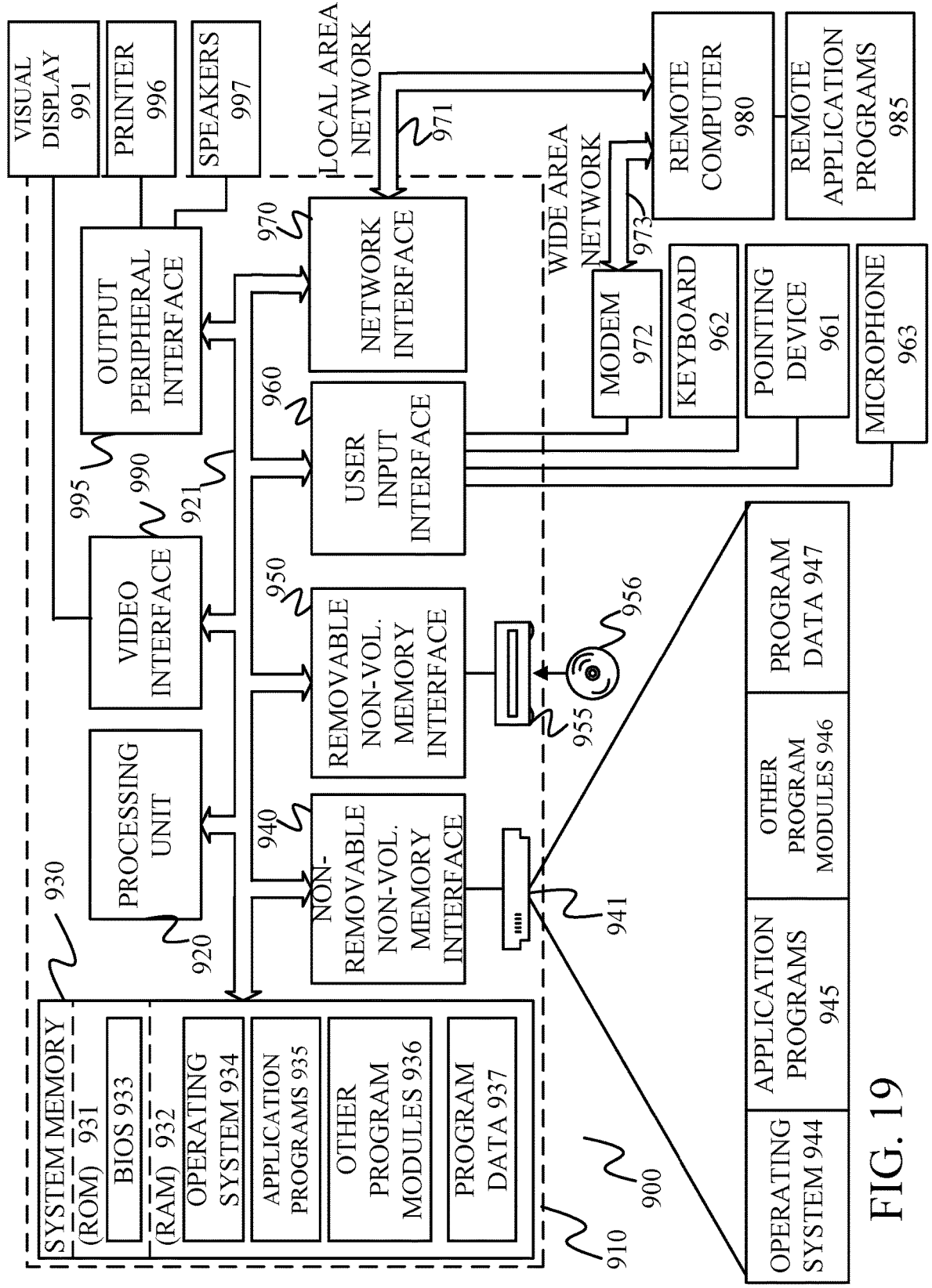
FIG. 19 is a block diagram of one example computing environment.

FIG. 19 is one example of a computing environment in which architecture 100, or parts of it, (for example) can be deployed. With reference to FIG. 19, an exemplary system for implementing some examples includes a general-purpose computing device in the form of a computer 910. Components of computer 910 may include, but are not limited to, a processing unit 920 (which can comprise processor(s) 104), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 19.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 19 illustrates operating system 934, application programs 935, other program modules 936, and program data 937.

The computer 910 may also include other removable/non-removable volatile/nonvolatile computer storage media. By way of example only, FIG. 19 illustrates a hard disk drive 941 that reads from or writes to non-removable, nonvolatile magnetic media, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 910. In FIG. 19, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 19 include a local area network (LAN) 971 and a wide area network (WAN) 773, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 19 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system comprising a display system, a user profile update system updating a user profile for a given user, a data extraction system analyzing a data source and extracting, from the data source, at least one work attribute associated with the given user, and a surfacing system comprising a suggestion generator component generating a user profile suggestion based on the at least one work attribute, and a display system controller controlling the display system to generate a user interface display, with user input mechanisms, that displays the user profile suggestion and detecting a user interaction with the user input mechanisms, the user profile update system updating the user profile based on the detected user interaction.

Example 2 is the computing system of any or all previous examples, wherein the user interface display comprises a user profile update display with a user input mechanism that corresponds to the user profile suggestion, the display system detecting user interaction with the user input mechanism, and the user profile update system is controlled to update the user profile with the user profile suggestion in response to the user interaction with the user input mechanism.

Example 3 is the computing system of any or all previous examples, wherein the data extraction system comprises an association generator generating an association between the given user and the work attribute, a node-edge graph that models entities as nodes and relationships between the entities as connections between nodes, wherein a first node represents the given user and a second node represents the data source, and a node-edge graph update component updating the node-edge graph to include a connection between the first and second nodes, the connection representing the association between the given user and the work attribute.

Example 4 is the computing system of any or all previous examples, wherein the user interaction defines a user acceptance of the user profile suggestion or a user rejection of the user profile suggestion, the node-edge graph update component updating the node-edge graph based on the user acceptance or the user rejection of the user profile suggestion.

Example 5 is the computing system of any or all previous examples, and further comprising an organization graph that represents users of an organization as nodes and connections between the nodes represent relationships between the users, and wherein the data extraction system comprises a name disambiguation component identifying a name in the data source that has a plurality of occurrences in the organization graph and disambiguating the name based on a location of the occurrences in the organization graph.

Example 6 is the computing system of any or all previous examples, the name disambiguation component identifying another name in the data source having an occurrence in the organization graph and disambiguating the name, having the plurality of occurrences in the organization graph, based on a proximate of each occurrence of the plurality of occurrences to the occurrence of the other name.

Example 7 is the computing system of any or all previous examples, and further comprising a permission system identifying access permissions of the given user relative to the data source and controlling the surfacing of the user profile suggestion based on the access permissions.

Example 8 is the computing system of any or all previous examples, wherein the data extraction system comprises an acronym processing component identifying an acronym in the data source and extracting a first work attribute based on the identified acronym, and the acronym processing component identifying an occurrence of the acronym in a second data source and extracting, from the second data source, a second work attribute based on the identified occurrence of the acronym.

Example 9 is the computing system of any or all previous examples, wherein the first and second work attributes represent projects.

Example 10 is a computing system comprising a data source accessing component accessing data sources, a classification component classifying each data source based on a structure of data from the data source, a data extraction system extracting work attribute data, from each data source, based on the classification of the data source, the work attribute data pertaining to one or more work attributes of a given user, and a profile update system updating a user profile based on the work attribute data.

Example 11 is the computing system of any or all previous examples, wherein each data source comprises a document.

Example 12 is the computing system of any or all previous examples, the data extraction system determining that the document comprises at least one of structured data or semi-structured data, and extracting user identification data, that identifies the given user, and work attribute data based on a location of the user identification data relative to the work attribute data in the document.

Example 13 is the computing system of any or all previous examples, the data extraction system identifying a table in the document and classifying columns or rows in the table as containing particular data types.

Example 14 is the computing system of any or all previous examples, the data extraction system classifying a first column or row as containing work attributes and to classify a second column or row as containing user identification data.

Example 15 is the computing system of any or all previous examples, the data extraction system obtaining a plurality of user/work attribute associations from a set of data sources comprising structured data and/or semi-structured data, and wherein the data extraction system comprises an unstructured data learning component comprising a model training component training an unstructured data extraction model, that extracts user/work attribute associations from unstructured data, based on the plurality of user/work attribute associations obtained from the set of data sources.

Example 16 is a computer-implemented method comprising extracting data from a data source, analyzing the extracted data to identify a user/work attribute association, the user/work attribute association associating a given user and a work attribute, identifying access permissions of the given user relative to the data source, and, based on the access permissions, surfacing the work attribute for inclusion in a user profile of the given user.

Example 17 is the computer-implemented method of any or all previous examples, wherein surfacing the work attribute comprises controlling a profile update system to update the user profile with the work attribute.

Example 18 is the computer-implemented method of any or all previous examples, wherein controlling the profile update system comprises generating a user interface display with user input mechanisms that surfaces the work attribute as a user profile suggestion, detecting a user interaction with the user input mechanism that accepts the work attribute for inclusion in the user profile, and, in response to the detected user interaction, controlling the profile update system to modify the user profile based on the user profile suggestion.

Example 19 is the computer-implemented method of any or all previous examples, and further comprising representing the user/work attribute association, in a node-edge graph, as an edge between a first node that represents the given user and a second node that represents the data source.

Example 20 is the computer-implemented method of any or all previous examples, wherein identifying access permissions of the given user relative to the data source comprises identifying the first node in the node-edge graph and traversing the edge to identify the data source represented by the second node, and determining a set of access permissions associated with the data source.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
    a display system;
    a user profile update system configured to update a user profile for a given user;
    a data extraction system configured to analyze a data source and extract, from the data source, a work attribute, wherein the data extraction system comprises:
        an association generator configured to generate an association between the given user and the work attribute;
        a node-edge graph that models entities as nodes and relationships between the entities as connections between nodes, wherein a first node represents the given user and a second node represents the data source: and
        a node-edge graph update component configured to update the node-edge graph to include a connection between the first node and the second node, the connection representing the association between the given user and the work attribute: and
    a surfacing system configured to:
        generate a user profile suggestion based on the work attribute; and
        control the display system to generate a user interface display, with user input mechanisms, that displays the user profile suggestion and detecting a user interaction with the user input mechanisms, the user profile update system configured to update the user profile based on the detected user interaction.

2. The computing system of claim 1, wherein the user interface display comprises a user profile update display with a user input mechanism that corresponds to the user profile suggestion, the display system detecting user interaction with the user input mechanism, and the user profile update system is controlled to update the user profile with the user profile suggestion in response to the user interaction with the user input mechanism.

3. The computing system of claim 1, wherein the user interaction defines a user acceptance of the user profile suggestion or a user rejection of the user profile suggestion, the node-edge graph update component updating the node-edge graph based on the user acceptance or the user rejection of the user profile suggestion.

4. The computing system of claim 1, and further comprising an organization graph that represents users of an organization as nodes and connections between the nodes represent relationships between the users, and wherein the data extraction system comprises:
    a name disambiguation component identifying a name in the data source that has a plurality of occurrences in the organization graph and disambiguating the name based on a location of the occurrences in the organization graph.

5. The computing system of claim 4, the name disambiguation component identifying another name in the data source having an occurrence in the organization graph and disambiguating the name, having the plurality of occurrences in the organization graph, based on a proximate of each occurrence of the plurality of occurrences to the occurrence of the other name.

6. The computing system of claim 1, and further comprising:
   a permission system identifying access permissions of the given user relative to the data source and controlling the surfacing of the user profile suggestion based on the access permissions.

7. The computing system of claim 1. wherein the data extraction system comprises:
   an acronym processing component identifying an acronym in the data source and extracting a first work attribute based on the identified acronym, and the acronym processing component identifying an occurrence of the acronym in a second data source and extracting, from the second data source, a second work attribute based on the identified occurrence of the acronym.

8. The computing system of claim 7, wherein the first work attribute and the second work attribute represent projects.

9. A computing system comprising:
   a display system;
   a user profile update system configured to update a user profile for a given user;
   a data extraction system configured to:
      analyze a data source;
      identify an acronym in the data source and extract a first work attribute based on the identified acronym;
      identify an occurrence of the acronym in a second data source and extract, from the second data source, a second work attribute based on the identified occurrence of the acronym; and
   a surfacing system configured to:
      generate a user profile suggestion based on the second work attribute; and
      control the display system to generate a user interface display, with user input mechanisms, that displays the user profile suggestion and detecting a user interaction with the user input mechanisms, the user profile update system configured to update the user profile based the detected user interaction.

10. The computing system of claim 9, wherein the first work attribute and the second work attribute represent projects.

11. The computing system of claim 9, wherein the user interface display comprises a user profile update display with a user input mechanism that corresponds to the user profile suggestion, the display system is configured to detect user interaction with the user input mechanism, and the user profile update system is controlled to update the user profile with the user profile suggestion in response to the user interaction with the user input mechanism.

12. The computing system of claim 9, wherein the data extraction system comprises:
   air association generator configured to generate an association between the given user and the work attribute;
   a node-edge graph that models entities as nodes and relationships between the entities as connections between nodes, wherein a first node represents the given user and a second node represents the data source; and
   a node-edge graph update component configured to update the node-edge graph to include a connection between the first and second nodes, the connection representing the association between the given user and the work attribute.

13. The computing system of claim 12, wherein the user interaction defines a user acceptance of the user profile suggestion or a user rejection of the user profile suggestion, the node-edge graph update component configured tai update the node-edge graph based on the user acceptance or the user rejection of the user profile suggestion.

14. The computing system of claim 9, and further comprising an organization graph that represents users of an organization as nodes and. connections between the nodes represent relationships between the users, and wherein the data extraction system comprises:
   a name disambiguation component configured to identify a name in the data source that has a plurality of occurrences in the organization graph and disambiguate the name based on a location of the occurrences in the organization graph.

15. A computing system comprising:
   a display system;
   an organization graph that represents users of an organization as nodes and connections
      between the nodes represent relationships between the user;
   a user profile update system configured to update a user profile for a given user;
   a data extraction system configured to analyze a. data source and extract, from the data
   source, a work attribute associated with the given user, wherein the data extraction system comprises:
      a name disambiguation component configured to identify a name in the data source that has a plurality of occurrences in the organization graph and disambiguate the name based on a location of the occurrences in the organization graph; and
   a surfacing system configured to:
      generate a user profile suggestion based on the work attribute; and
      control the display system to generate a user interface display, with user input mechanisms, that displays the user profile suggestion and detect, a user interaction with the user input mechanisms, the user profile update system configured to update the user profile based on the detected user interaction.

16. The computing system of claim 15, wherein the name disambiguation component is configured to identify another name in the data source having an occurrence in the organization graph and disambiguate the name, having the plurality of occurrences in the organization graph, based on a proximate of each occurrence of the plurality of occurrences to the occurrence of the other name.

17. The computing system of claim 15, and further comprising:
   a permission system configured to identify an access permission of the given user relative to the data source and to generate the user profile suggestion based on the access permission.

18. The computing system of claim 15, wherein the user interface display comprises a user profile update display with a user input mechanism that corresponds to the user profile suggestion, the display system configured to detect user interaction with the user input mechanism, and the user profile update system is controlled to update the user profile with the user profile suggestion in response to the user interaction with the user input mechanism.

19. The computing system of claim 15, wherein the data extraction system comprises:
   an association generator configured to generate an association between the given user and the work attribute;
   a node-edge graph that models entities as nodes and relationships between the entities as connections between nodes, wherein a first node represents the given user and a second node represents the data source; and a node-edge graph update component configured to update the node-edge graph to include a connection between the first and second nodes, the connection representing the association between the given user and the work attribute.

20. The computing system of claim 19, wherein the user interaction defines a user acceptance of the user profile suggestion or a user rejection of the user profile suggestion, the node-edge graph update component configured to update the node-edge graph based on the user acceptance or the user rejection of the user profile suggestion.

\* \* \* \* \*